US010845592B2

(12) United States Patent
Katagiri et al.

(10) Patent No.: US 10,845,592 B2
(45) Date of Patent: Nov. 24, 2020

(54) HEAD-UP DISPLAY, VEHICLE APPARATUS, DISPLAY METHOD, AND RECORDING MEDIUM

(71) Applicant: Ricoh Company, Ltd., Tokyo (JP)

(72) Inventors: Keita Katagiri, Kanagawa (JP); Kenichiroh Saisho, Tokyo (JP); Masato Kusanagi, Kanagawa (JP); Yuuki Suzuki, Kanagawa (JP); Hiroshi Yamaguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 96 days.

(21) Appl. No.: 15/856,878

(22) Filed: Dec. 28, 2017

(65) Prior Publication Data

US 2018/0180880 A1  Jun. 28, 2018

(30) Foreign Application Priority Data

Dec. 28, 2016 (JP) .................... 2016-256066

(51) Int. Cl.
*G09G 5/38* (2006.01)
*B60K 35/00* (2006.01)
(Continued)

(52) U.S. Cl.
CPC .......... *G02B 27/0101* (2013.01); *B60K 35/00* (2013.01); *G02B 26/0833* (2013.01);
(Continued)

(58) Field of Classification Search
CPC .. G09G 3/3406; G09G 3/003; G09G 2310/08; G09G 2330/026;
(Continued)

(56) References Cited

U.S. PATENT DOCUMENTS 8,676,431 B1 * 3/2014 Mariet ...................... B60T 7/22
701/28
2008/0285139 A1* 11/2008 Chen .................. G02B 27/0101
359/630

(Continued)

FOREIGN PATENT DOCUMENTS

JP   2000-057491    2/2000
JP   2006-015803 A  1/2006
(Continued)

OTHER PUBLICATIONS

Extended European Search Report dated May 17, 2018 in European Patent Application No. 17210883.9, 9 pages.
(Continued)

*Primary Examiner* — Md Saiful A Siddiqui
(74) *Attorney, Agent, or Firm* — Xsensus LLP

(57) ABSTRACT

A head-up display (HUD) mountable on a vehicle includes circuitry. The circuitry is configured to obtain a detection result indicating a position of an object relative to the vehicle, as the vehicle travels; and control a display system to display, based on a detection result, an indicator indicating the position of the object as a virtual image within a display area, while changing an orientation of the indicator according to the position of the object.

19 Claims, 30 Drawing Sheets

(51) Int. Cl.
  *G06T 11/60* (2006.01)
  *B60Q 9/00* (2006.01)
  *G02B 27/01* (2006.01)
  *G02B 26/08* (2006.01)
  *G02B 26/10* (2006.01)
  *G01S 17/931* (2020.01)

(52) U.S. Cl.
  CPC .... *B60K 2370/334* (2019.05); *B60K 2370/52* (2019.05); *G01S 17/931* (2020.01); *G02B 26/10* (2013.01); *G02B 2027/014* (2013.01); *G02B 2027/0141* (2013.01); *G02B 2027/0145* (2013.01)

(58) Field of Classification Search
  CPC . G09G 2320/0626; G06F 3/013; G06F 3/017; G06F 3/011; G06F 3/0346; G06F 3/04815; G06F 3/03547; G06F 3/038; G06F 3/0482; G06F 3/04842; G06F 3/04855; G06F 3/04883
  See application file for complete search history.

(56) References Cited

U.S. PATENT DOCUMENTS

| | | | |
|---|---|---|---|
| 2014/0005941 A1* | 1/2014 | Paek | G01C 21/3438 701/533 |
| 2014/0177022 A1 | 6/2014 | Saisho et al. | |
| 2015/0062345 A1 | 3/2015 | Kusanagi | |
| 2015/0277115 A1 | 10/2015 | Inamoto et al. | |
| 2015/0370069 A1 | 12/2015 | Saisho et al. | |
| 2016/0170487 A1 | 6/2016 | Saisho | |
| 2016/0214607 A1* | 7/2016 | Dolgov | B60W 30/16 |
| 2016/0313562 A1 | 10/2016 | Saisho et al. | |
| 2016/0334637 A1 | 11/2016 | Saisho et al. | |
| 2017/0155867 A1 | 6/2017 | Yokota et al. | |
| 2017/0158132 A1* | 6/2017 | Sasano | B60K 35/00 |
| 2017/0253181 A1* | 9/2017 | Choi | B60Q 9/008 |
| 2017/0315353 A1 | 11/2017 | Saisho et al. | |
| 2017/0336222 A1 | 11/2017 | Yamaguchi et al. | |
| 2017/0336629 A1 | 11/2017 | Suzuki et al. | |
| 2018/0198955 A1* | 7/2018 | Watanabe | B60K 35/00 |
| 2018/0286094 A1* | 10/2018 | Shishido | B60K 35/00 |

FOREIGN PATENT DOCUMENTS

| | | |
|---|---|---|
| JP | 2013-47021 A | 3/2013 |
| JP | 2015-009677 | 1/2015 |
| JP | 2015-049266 | 3/2015 |
| WO | 2014/199574 A1 | 12/2014 |
| WO | WO 2015/004784 A1 | 1/2015 |
| WO | WO 2016/013167 A1 | 1/2016 |

OTHER PUBLICATIONS

Office Action dated Sep. 1, 2020, in corresponding Japanese patent Application No. 2016-256066, 9 pages.

* cited by examiner

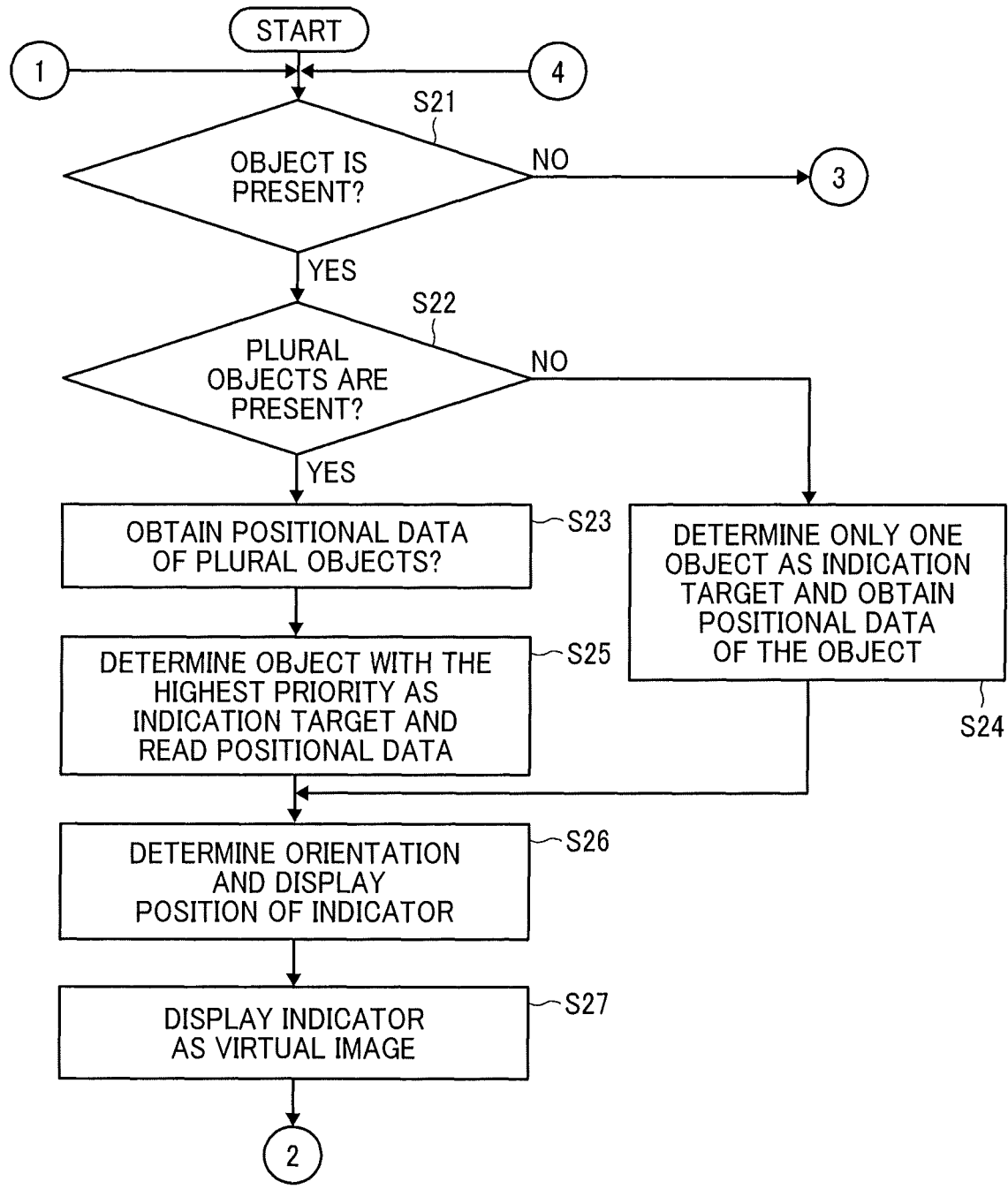

HEAD-UP DISPLAY, VEHICLE APPARATUS, DISPLAY METHOD, AND RECORDING MEDIUM

CROSS-REFERENCE TO RELATED APPLICATION

This patent application is based on and claims priority pursuant to 35 U.S.C. § 119(a) to Japanese Patent Application No. 2016-256066, filed on Dec. 28, 2016 in the Japan Patent Office, the entire disclosure of which is hereby incorporated by reference herein.

BACKGROUND

Technical Field

Embodiments of the present disclosure relate to a heads-up display (HUD), a vehicle apparatus, a display method, and a recording medium.

Related Art

A heads-up display (HUD) is known that is mounted on a vehicle and displays a mark as a virtual image in a display area to specify an object.

SUMMARY

In one aspect of this disclosure, there is provided an improved head-up display (HUD) mountable on a vehicle circuitry. The circuitry is configured to obtain a detection result indicating a position of an object relative to the vehicle, as the vehicle travels; and control a display system to display, based on a detection result, an indicator indicating the position of the object as a virtual image within a display area, while changing an orientation of the indicator according to the position of the object.

In another aspect of this disclosure, there is provided a system for a vehicle including the above-described HUD and a vehicle on which the HUD is mounted.

In yet another aspect of this disclosure, there is provided an improved method of displaying, performed by a head-up display mountable on a vehicle, including obtaining a detection result indicating a position of an object relative to the vehicle, as the vehicle travels; and controlling a display system to display, based on a detection result, an indicator indicating the position of the object as a virtual image within a display area, while changing an orientation of the indicator according to the position of the object.

In further aspect of this disclosure, there is provided an improved non-transitive medium storing a program for causing a computer to execute a method of displaying including obtaining a detection result indicating a position of an object relative to the vehicle, as the vehicle travels; controlling a display system to display, based on a detection result, an indicator indicating the position of the object as a virtual image within a display area, while changing an orientation of the indicator according to the position of the object.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIGS. 19A and 19B are illustrations of a flowchart for describing display processing 2;

Figure 1:
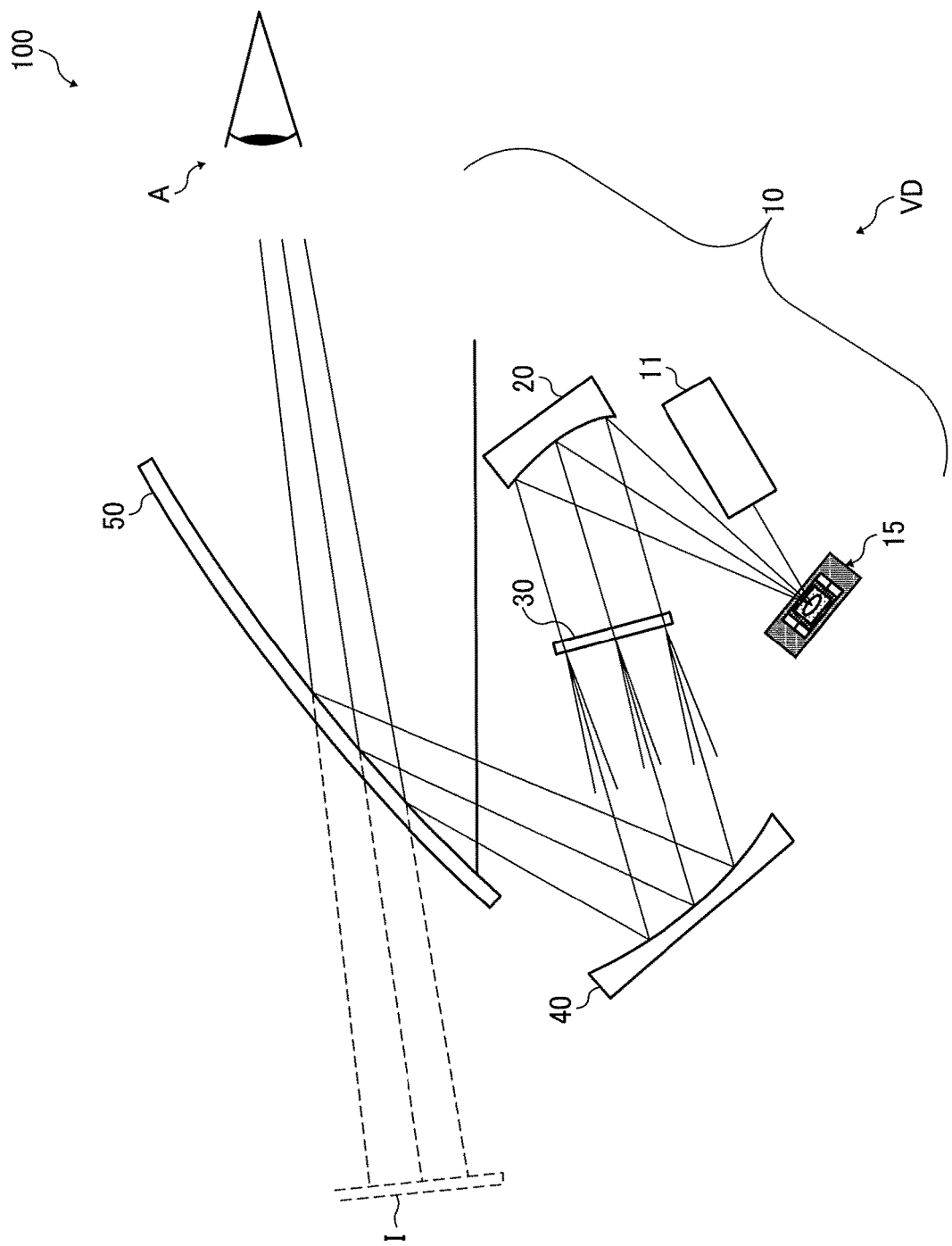
FIG. 1 is an illustration of a schematic configuration of a heads-up display (HUD) according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

A description is given of embodiments of an information processing apparatus, an imaging device, a device control system, a mobile object, an information processing method, and a program according to the present disclosure, referring to FIGS. 1 through 24. The present disclosure is not limited to the following embodiments, and the constituent elements of the embodiments includes those which can be easily conceived by those skilled in the art, substantially the same ones, and those in the following embodiments include those which can be easily conceived by those skilled in the art, substantially the same, and within equivalent ranges. Furthermore, various omissions, substitutions, changes and combinations of constituent elements can be made without departing from the gist of the following embodiments.

Outline

A description is given of a heads-up display (HUD) 100 according to an embodiment of the present disclosure, referring to the figures.

FIG. 1 is an illustration of a schematic configuration of the HUD 100 according to the present embodiment.

Schematic Configuration of HUD

As an HUD projection method, there is a panel system and a laser scanning system. In the panel system, an imaging device, such as a liquid crystal display (LCD), a digital micro-mirror device (DMD) panel (digital mirror device panel), or a vacuum fluorescent display (VFD) is used to form an intermediate image. In the laser scanning method, a two-dimensional scanning device scans an object with a laser beam emitted from a laser beam source to form an intermediate image. In particular, in the latter laser scan type, unlike the panel type where the image is formed by partial light blocking over the entire screen emission, since emission can be controlled on a pixel-by-pixel basis, in general, a high-contrast image can be formed.

In view of the above, the HUD 100 according to the present embodiment adopts the laser scanning system. In some embodiments, the HUD 100 according to the present embodiment may adopt the above-described panel system as the projection system.

The HUD 100 is mounted, for example, on a mobile object such as a vehicle, and makes navigation information used for operating the vehicle (for example, speed of the vehicle, course information, distance to a destination, name of current place, the presence and position of an object (target) ahead of the vehicle, signs, such as speed limit, and traffic congestion information) visible through a windshield 50 (see FIG. 1) of the vehicle. In such a case, the windshield 50 also serves as a transmission and reflection member that transmits a portion of the incident light and reflects at least some of the remaining incident light. In the following description, cases in which the HUD 100 is mounted on a vehicle having the windshield 50 are described.

As illustrated in FIG. 1, the HUD 100 includes an optical scanning device 10, a screen 30, and a concave mirror 40. The optical scanning device 10 includes a light-source unit 11, which is also referred to as a light source, a light deflector 15, and a scanning mirror 20. The HUD 100 emits light (image light) for forming an image on the windshield 50, to allow a viewer A (in the present embodiment, a driver as a passenger position of a vehicle) to visually identify a virtual image I at eye-level. In other words, the viewer A can visually identify, through the windshield 50, an image (intermediate image) as the virtual image formed (drawn) on the screen 30 by the optical scanning device 10.

The HUD 100 is disposed under the dashboard of the vehicle, as an example. The distance from the viewpoint position of the viewer A to the windshield 50 ranges from several tens of centimeters (cm) to approximately 1 meter (m).

In the present embodiment, the concave mirror 40 is designed by using a commercially available optical-designed simulation software such that the concave mirror 40 obtains a predetermined level of light-gathering power to achieve a desired image-forming position of the virtual image I.

In the HUD 100, the light-gathering power of the concave mirror 40 is designed such that the virtual image I is displayed at a position (in depth) with 1 m or more and 30 m or less (preferably 10 m or less) away from the viewpoint position of the viewer A.

The windshield 50 typically has a slightly curved surface, and is not a flat plane. The curved surfaces of the concave mirror 40 and the windshield 50 determine the image-forming position of the virtual image I.

The light-source unit 11 combines laser beams of three colors R (red), G (green), and B (blue) modulated according to image data. The combined light, in which the three-color laser beams are combined, is guided to the reflection plane of the light deflector 15. The light deflector 15 as a deflector is a micro-electromechanical system (MEMS) scanner produced by, e.g., a semiconductor manufacturing process. The light deflector 15 includes a single micro-mirror that is independently rotatable about two perpendicular axes. The light-source unit 11 and the light deflector 15 are described later in detail.

The light (the above-described combined light) according to image data output from the light-source unit 11 is deflected by the light deflector 15 and reflected by the scanning mirror 20. Thus, the light is directed to the screen 30. Then, the screen 30 is optically scanned to form an intermediate image thereon. The light deflector 15 and the scanning mirror 20 constitute an optical scanning system. Note that, preferably, the concave mirror 40 is designed and disposed to correct the optical deformation in which the horizon of the intermediate image is distorted convexly upward or downward due to the shape of the windshield 50.

The light having passed through the screen 30 is reflected by the concave mirror 40 toward the windshield 50. Some of light rays that enter the windshield 50 permeate the windshield 50, and at least some of the remaining light rays are reflected by the windshield 50 toward the viewpoint position of a viewer A. As a result, the viewer A can visually identify, through the windshield 50, a virtual image I that is an enlarged intermediate image. That is, the viewer A can see an enlarged virtual image I through the windshield 50.

In some embodiments, a combiner as the transmission and reflection member may be disposed closer to the viewpoint position of the viewer A than the windshield 50 to receive light from the concave mirror 40, which allows displaying a virtual image in the same manner as in the configuration with only the windshield 50 disposed.

Hardware Configuration of Control System of the HUD

Figure 2:
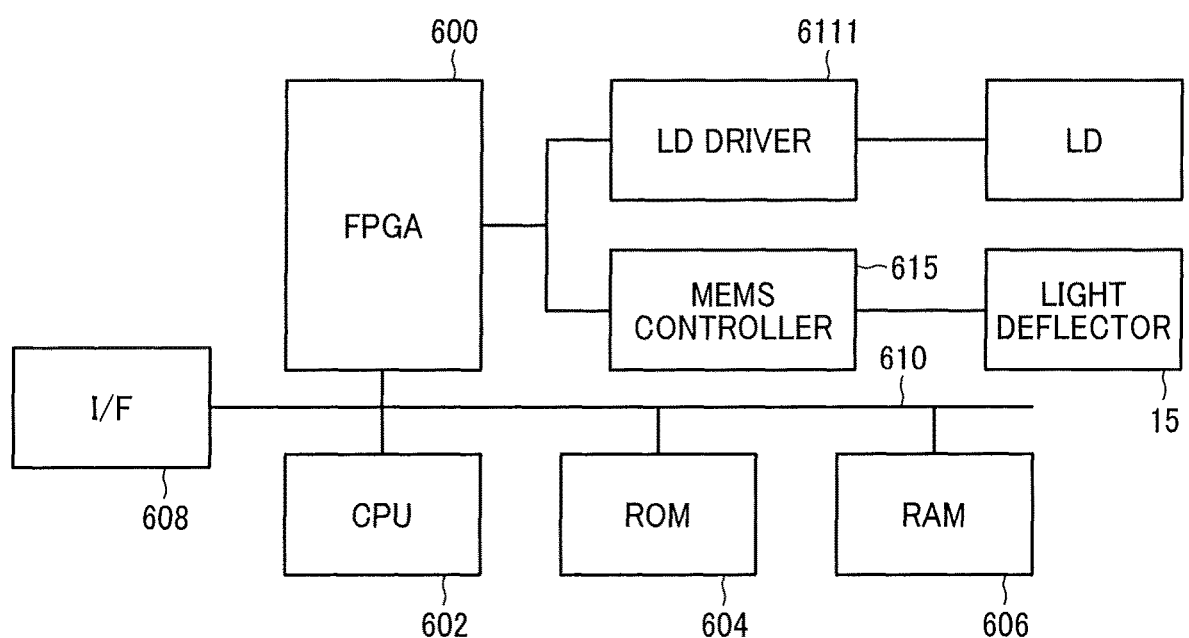
FIG. 2 is a block diagram of a hardware configuration of a control system of the HUD.

FIG. 2 is a block diagram of a hardware configuration of a control system of the HUD 100. As illustrated in FIG. 2, the HUD 100 includes an field programmable gate array (FPGA) 600, a central processing unit (CPU) 602, a read-only memory (ROM) 604, a random access memory (RAM) 606, an interface (IF) 608, a bus line 610, a laser diode (LD) driver 6111, and a micro-electromechanical systems (MEMS) controller 615.

The FPGA 600 causes the LD driver 6111 to drive an LD described below, and causes the MEMS controller 615 to control the light deflector 15 according to image data. The CPU 602 controls each operation of the HUD 100. The ROM 604 stores an image processing program that is executed by the CPU 602 to control operation of the HUD 100. The RAM 606 is used as a working area in which the CPU 602 executes the program. The IF 608 is an interface to communicate with an external controller such as a controller area network (CAN) of a vehicle.

Functional Blocks of the HUD

Figure 3:
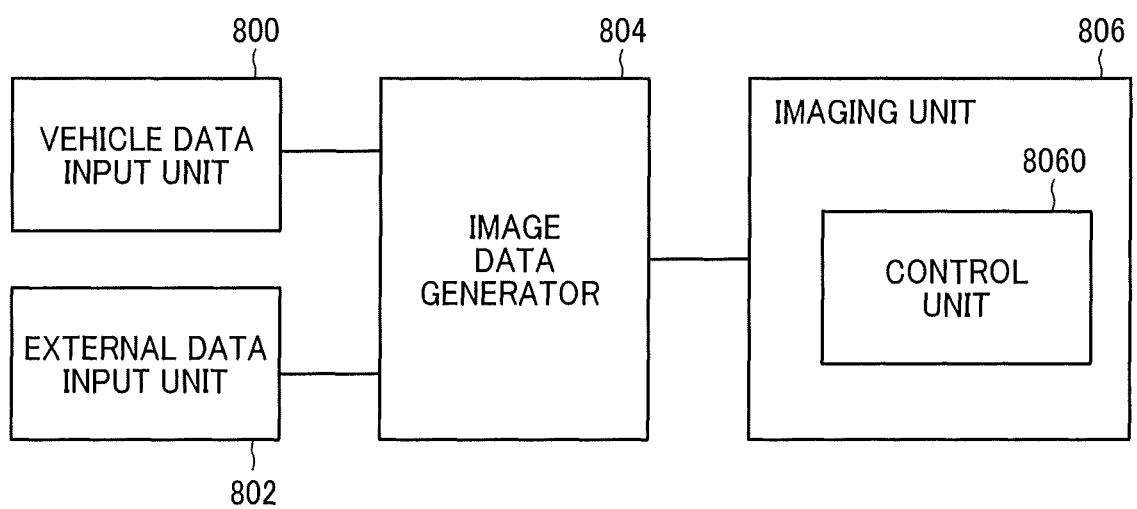
FIG. 3 is a functional block diagram of the HUD according to an embodiment of the present disclosure.

FIG. 3 is a block diagram of the HUD 100. As illustrated in FIG. 3, the HUD 100 includes a vehicle data input unit 800, an external data input unit 802, an image data generator 804, and an imaging unit 806. The vehicle data input unit 800 receives vehicle-related data, such as the speed of the vehicle, the travel distance, the position of an object, and the exterior brightness, from the CAN. The external data input unit 802 receives external data, such as navigation information from a global positioning system (GPS) mounted on a vehicle, from the external network. The image data generator 804 generates image data of an image to be drawn according to the data input from the vehicle data input unit 800 and the external data input unit 802, and sends the generated image data to an imaging unit 806. The imaging unit 806 includes a control unit 8060 to draw an image according to the image data received. The image data generator 804 and the control unit 8060 are implemented by the FPGA 600. The imaging unit 806 is implemented by the FPGA 600, the LD driver 6111, the MEMS controller 615, the optical scanning device 10, the screen 30, and the concave mirror 40.

Configuration of Light-Source Unit

Figure 4:
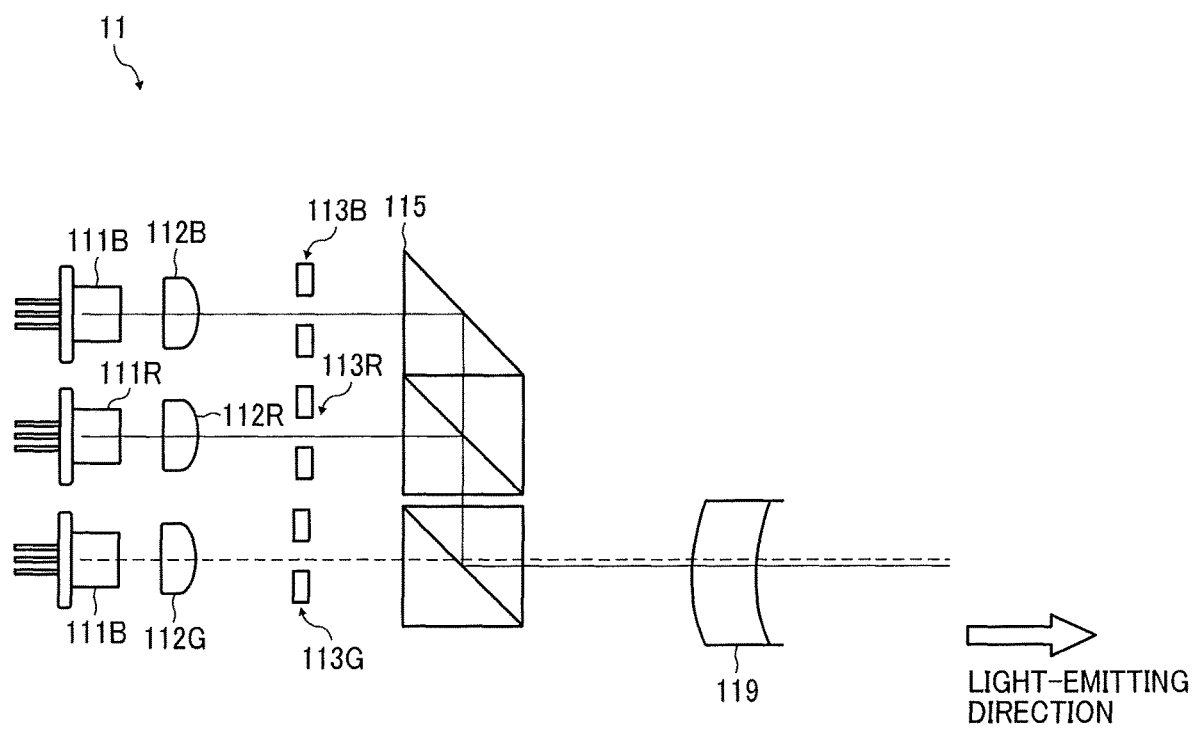
FIG. 4 is an illustration of a light-source unit of the HUD according to an embodiment of the present disclosure.

FIG. 4 is an illustration of a configuration of the light-source unit 11. As illustrated in FIG. 4, the light-source unit 11 includes a plurality of light-emitting elements 111R, 111B, and 111G each having a single or a plurality of (for example, three light-emitting points in the present embodiment) light-emitting points. The light-emitting elements 111R, 111B, and 111G is laser diode (LD)111R, LD111B, and LD 111G. The light-emitting elements 111R, 111B, and 111G emit light beams having different wavelengths $\lambda R$, $\lambda G$, and $\lambda B$, respectively. For example, the wavelength $\lambda R$ is 640 nanometer (nm), the wavelength $\lambda G$ is 530 nm, and $\lambda B$ is 445 nm. Laser beams $\lambda R$, $\lambda G$, and $\lambda B$ emitted from the light-emitting elements (LD) 111R, 111G, and 111B pass through the respective coupling lenses 112R, 112G, and 112B to be coupled to a subsequent optical system. The coupled laser beams are shaped by aperture members 113R, 113G, and 113B corresponding to the respective laser beams. The aperture members 113R, 113G, and 113B may have any shape, such as a circle, an ellipse, a rectangle, or a square, according to the divergence angle of the laser beam. The laser beams shaped by the corresponding aperture members 113R, 113G, and 113B pass through a combining element 115 to be combined into one laser beam that travels along one optical path. The combining element 115 is a plate or prismatic dichroic mirror to reflect or transmit each of the laser beams therethrough according to the wavelength of each of the laser beams and thus combine the laser beams into one laser beam that travels along one optical path. The combined laser beam passes through a lens 119 to be guided to the reflection plane of the light deflector 15. The lens 119 is a meniscus lens having a concave surface facing the light deflector 15.

Configuration of Light Deflector

Figure 5:
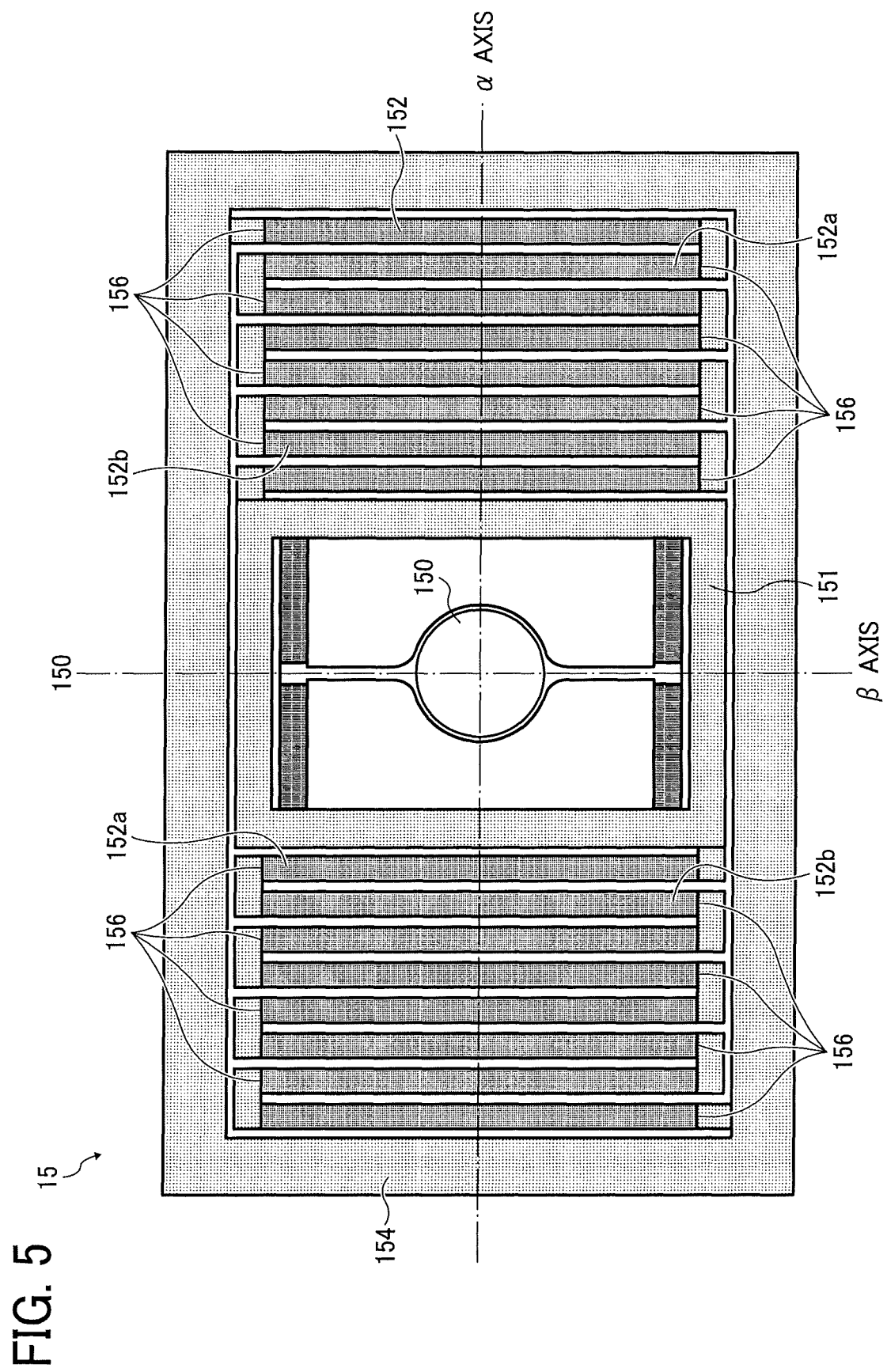
FIG. 5 is an illustration of a light deflector of the HUD according to an embodiment of the present disclosure.

FIG. 5 is an illustration of a configuration of the light deflector 15. As illustrated in FIG. 5, the light deflector 15, which is a two-axis MEMS scanner produced by a semiconductor manufacturing process, includes a mirror 150 having a reflection plane and a plurality of bars arranged in an a-axis direction. The light deflector 15 further includes a pair of serpentine units 152 in which two adjacent beams are connected to form a meander. The two adjacent beams of each serpentine unit 152 are a first beam 152a and a second beam 152b. The first beam 152a and the second beam 152b are supported by a frame member 154. Each of the first beam 152a and the second beam 152b is provided with a plurality of piezoelectric materials 156 (for example, PZT (lead zirconate titanate)). Different voltages are applied to the piezoelectric member of the two adjacent beams in each serpentine unit 152. Accordingly, the two adjacent beams 152a and 152b bend in different directions. As elastic energy is accumulated in the bent portion, the mirror 150 rotates about the $\alpha$ axis (in the vertical direction) with a wide angle. Due to such a configuration, optical scanning where the vertical axis is the center of the $\alpha$ axis can be performed in the vertical direction with lower voltage. On the other hand, around the $\beta$ axis in the horizontal direction, the optical scanning with resonance is performed using, for example, a torsion bar that is connected to the mirror 150.

Although the HUD 100 momentarily projects a dot image corresponding to a laser beam diameter, an afterimage within one frame image sufficiently remains in a human eye because of very-high-speed scanning. Such an afterimage phenomenon allows an identifier to perceive the afterimage as an image projected onto an "image display area". In actuality, the image having been displayed on the screen 30 is reflected by the concave mirror 40 and the windshield 50 and the image is perceived as a virtual image by an identifier in the image display area. In such a mechanism, the light emission of the LD may be stopped when no image is displayed. In other words, the luminance can be substantially set to 0 for any place other than the place in which a virtual image is displayed in the image display area.

More specifically, the image-forming position of a virtual image formed by the HUD 100 is any position within the image display area in which the virtual image can be formed. Such an image display area is determined according to the design specifications for the HUD.

As described above, the laser scanning system is adopted in the present embodiment. This allows switching off the LD or reducing the amount of light of the LD for portions not to be displayed (hidden).

In the panel system, in which an intermediate image is expressed by the imaging device, such as a liquid crystal display (LCD) and a digital micro-mirror device (DMD), completely hiding the images is difficult even in a black display mode due to the properties of the LCD and the DMD in which the entire panel is illuminated. This causes misadjusted black level. However, the laser scanning system can prevent such a misadjusted black level (black floating).

Figure 6:
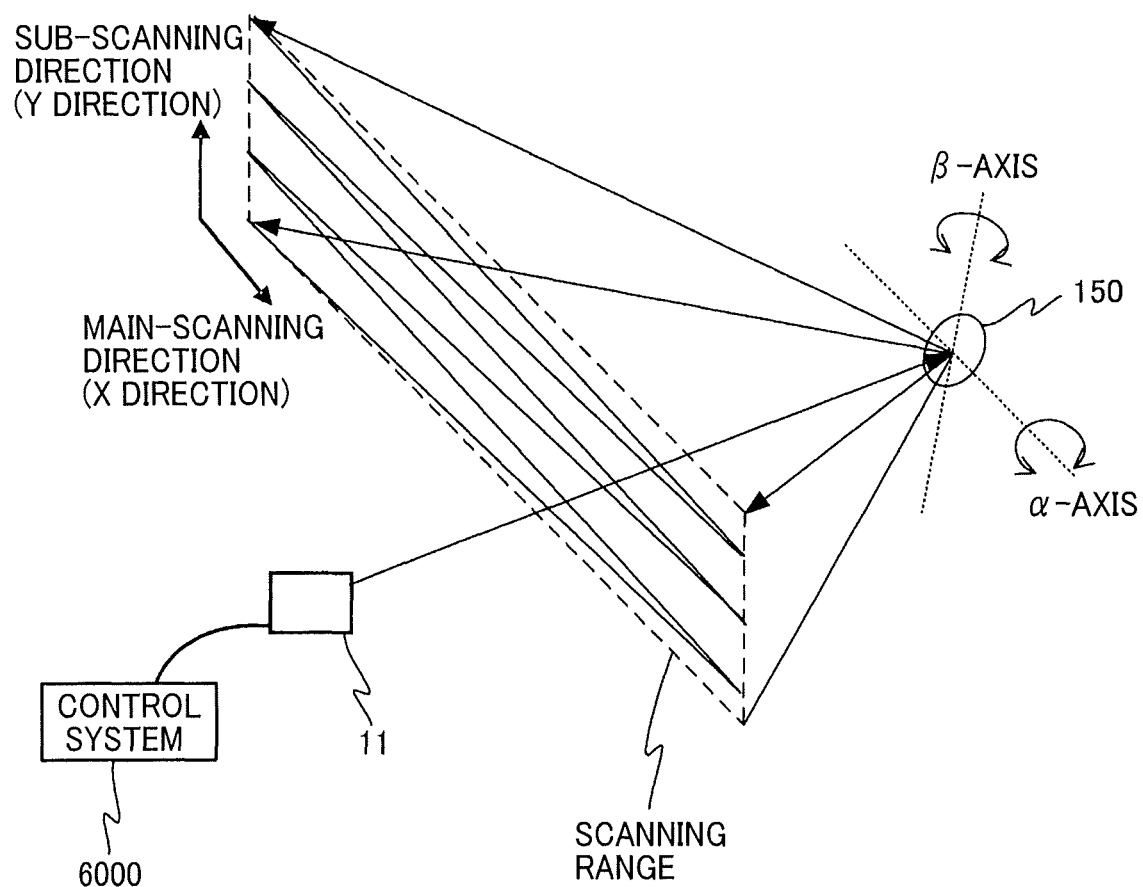
FIG. 6 is a illustration of the corresponding relation between a mirror of the light deflector and the scanning range.

Note that, the FPGA 600 controls the light-emission intensity, timing of light emission, and received-light waveform of each of the light-emitting elements 111R, 111B, and 111G in the light-source unit 11. The LD driver 6111 drives each of the light-emitting elements 111R, 111B, and 111G to emit light. As illustrated in FIG. 6, the light beam, which has been emitted from each of the light-emitting elements 111R, 111B, and 111G and combined to travel along one optical path, is two-dimensionally deflected by the light deflector 15 around the α axis and the β axis. The deflected light beam is reflected by the scanning mirror 20 (see FIG. 1), and the reflected light beam as scanning light scans the screen 30. That is, the scanning light two-dimensionally scans the screen 30.

The scanning light scans (two-way scans) a scanning range of the screen 30 in a vibrating manner along the main scanning direction at a high frequency of approximately from 20,000 to 40,000 hertz (Hz), and one-way scans the scanning range in the sub-scanning direction at a low frequency of approximately a few tens of Hz. That is, the optical scanning system performs a raster scan. In so doing, controlling light emission of each light-emitting element (111B, 111R, and 111G) according to a scanning position (the position of the scanning light) allows writing an image and displaying a virtual image for each pixel.

The length of time to write an image in one frame, that is, the length of time for scanning one frame (one cycle of two-dimensional scanning), is a few tens of millisecond (msec), determined by the above-described frequency of a few tens of Hz for the sub-scanning direction (sub-scanning frequency). For example, with a frequency of 20,000 Hz for the main-scanning direction (main-scanning frequency) and a sub-scanning frequency of 50 Hz, scanning for one frame takes 20 msec.

Figure 7:
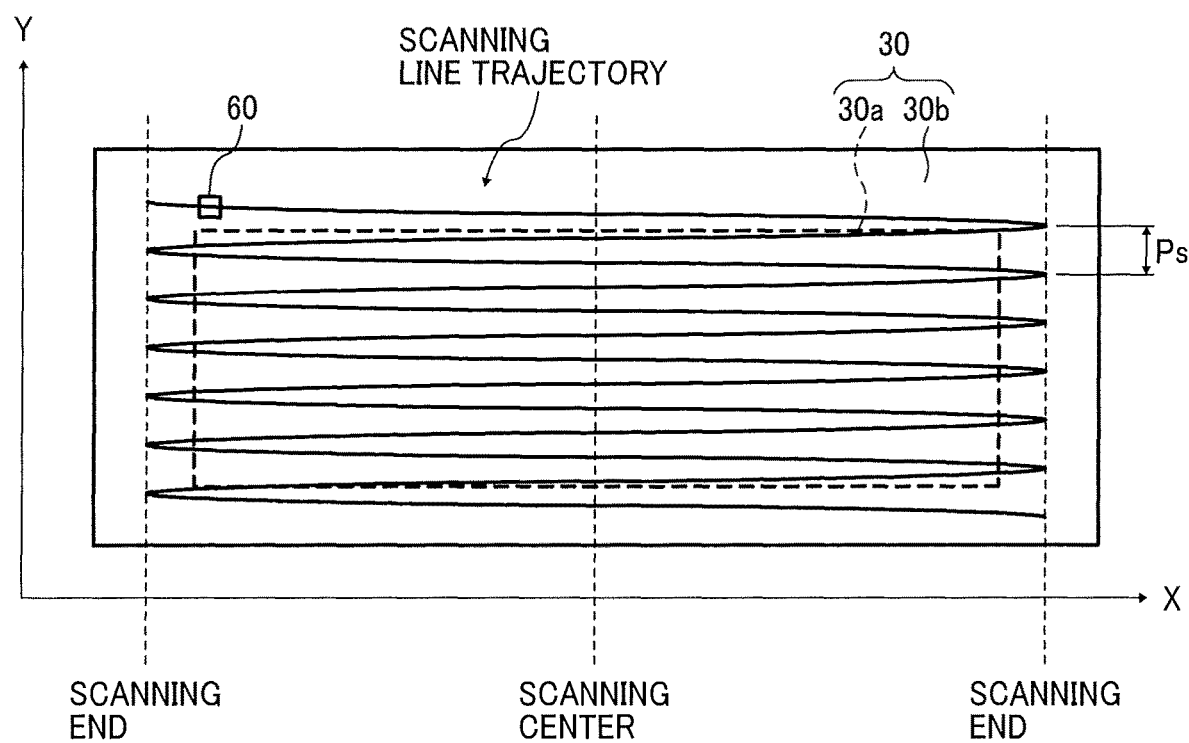
FIG. 7 is an illustration of an example of a trajectory of a scanning line when two-dimensional scanning is performed, according to an embodiment of the present disclosure.

As illustrated in FIG. 7, the screen 30 includes an image area 30a (effective scanning area) in which images are written (illuminated with modulated light according to image data). The screen 30 further includes a marginal area 30b that surrounds the image area.

In the present embodiment, the entire area to be scanned by the light deflector 15 is referred to as a "scanning range". In the present embodiment, the scanning range is the combination of the image area 30a and a part of the marginal area 30b (portion near the periphery of the image area 30a). In FIG. 7, the trajectory of the scanning line in the scanning range is indicated by a zigzag line. The number of scanning lines shown in FIG. 7 is less than the actual number for the sake of simplification.

The image area 30a of the screen 30 includes a transmissive element, such as a microlens array, that exhibits a light diffusion effect. In the present embodiment, the image area 30a is rectangular and planar as illustrated in FIG. 7. However, no limitation is intended thereby. In some embodiments, the image area 30a may be polygon or curved. Alternatively, in some embodiments, the screen 30 may be a flat plate or curved plate that is incapable of diffusing light. Further, in some embodiments, the image area 30a is a reflective element such as a micromirror array that exhibits a light diffusion effect, according to the design of the HUD 100.

Figure 8A:
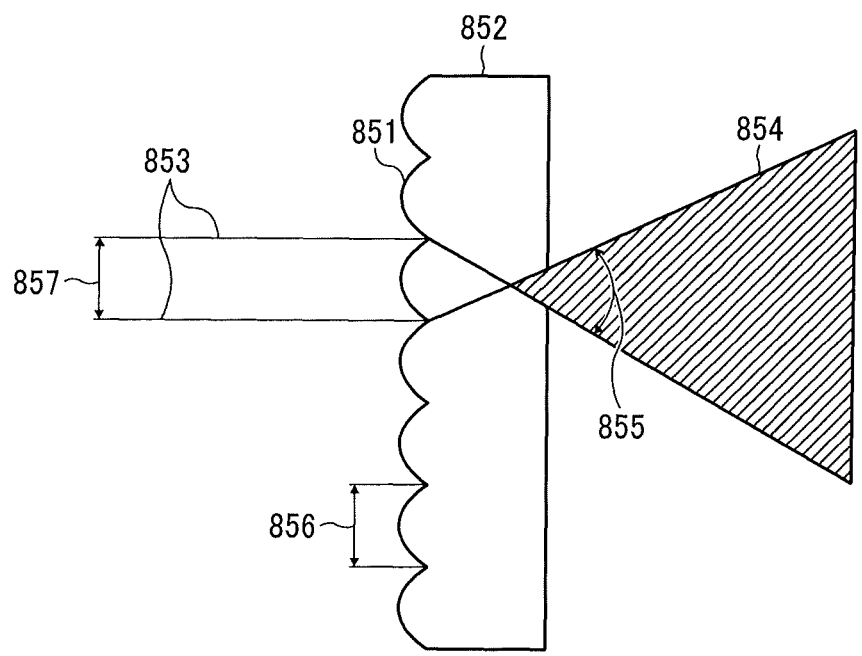
FIGS. 8A and 8B are illustrations for describing a difference in operation with changes in a laser-beam diameter and a lens diameter in a microlens array.
Figure 8B:
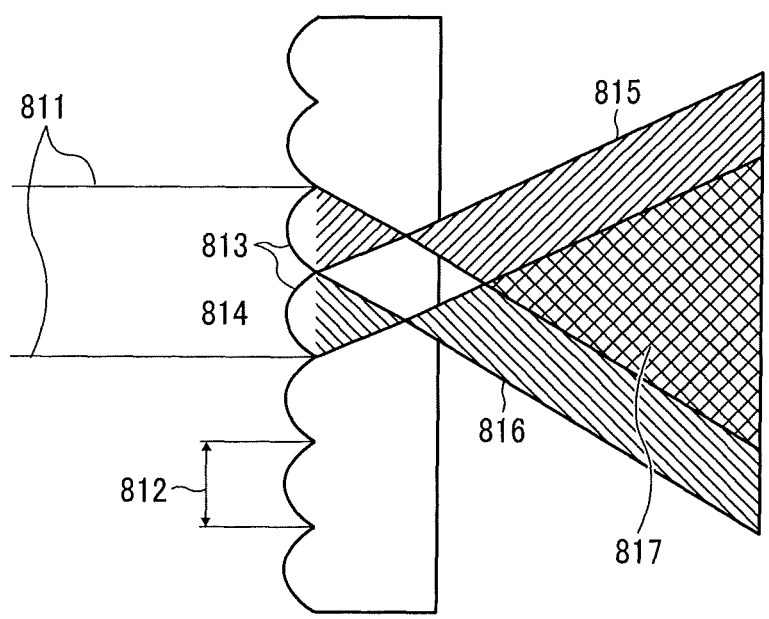

The following describes diffusion and coherent noise that occurs in a microlens array used in the image area 30a of the screen 30 referring to FIGS. 8A and 8B.

FIG. 8A illustrates a microlens array 852. The microlens array 852 has a micro-convex lens structure in which micro-convex lenses 851 are arranged. A laser-beam diameter 857 of a pixel displaying beam 853 is smaller than a size 856 of each micro-convex lens 851. In other words, the size 856 of each micro-convex lens 851 is larger than the laser-beam diameter 857. Note that, the pixel displaying beam 853 according to the present embodiment is a laser beam and has a light intensity distribution of a Gaussian distribution around the center of the laser beam. Accordingly, the laser-beam diameter 857 is a distance in the radial direction of a laser beam where the light intensity in the light intensity distribution decreases to "1/e2".

In FIG. 8A, the laser-beam diameter 857 is drawn to have a size equal to the size 856 of each micro-convex lens 851. However, in some embodiments, the laser-beam diameter 857 may not be equal to the size 856 of the micro-convex lens 851. The light-beam diameter 857 is satisfactory as long as its size does not exceed the size 856 of each micro-convex lens 851.

In FIG. 8A, the entire pixel displaying beam 853 is incident on one micro-convex lens 851 and is converted to a diffused laser beam 854 having a divergence angle 855. Note that the "divergence angle" may be referred to as a "diffusion angle" in some cases.

In FIG. 8A, one laser beam is diffused (the diffused laser beam 854) without any interfering laser beam, and thus no coherent noise occurs. Note that the size of the divergence angle 855 may be set by adjusting the shape of the micro-convex lens 851 as appropriate.

In FIG. 8B, the laser-beam diameter of the pixel displaying beam 811 is twice the array pitch 812 of the micro-convex lenses, and the pixel displaying beam 811 enters both micro-convex lenses 813 and 814. In this case, the pixel displaying beam 811 passes through the two micro-convex lenses 813 and 814, thereby separating into two laser beams 815 and 816 each of which diverges. The two laser beams 815 and 816 overlap each other in an area 817 to interfere with each other therein, so that coherent noise occurs.

Referring to FIG. 7, a synchronous detection system 60 including light-receiving elements is disposed outside (the part of the marginal area 30b) the image area 30a in the scanning range. In the present embodiment, the synchronous detection system 60 is disposed on the +Y side of the corner of −X side and +Y side of the image area 30a. Hereinafter, the main-scanning direction of the screen 30 is referred to as the X direction, and the sub-scanning direction of the screen 30 is referred to as the Y direction.

The synchronous detection system 60 detects the operation of the light deflector 15 and outputs, to the FPGA 600, a synchronization signal to determine the timing of starting scanning and the timing of terminating scanning.

Details
Indicator

The driver of the vehicle drives according to information within the field-of-view seen through the windshield 50. The driver accurately recognizes the position of an object such as another vehicle, a pedestrian, and an obstacle, so as to promote safe driving.

Considering such circumstances, the HUD 100, displays an indicator, as a virtual image, that indicates an object within a display area (see FIGS. 10A through 10D).

Figure 9:
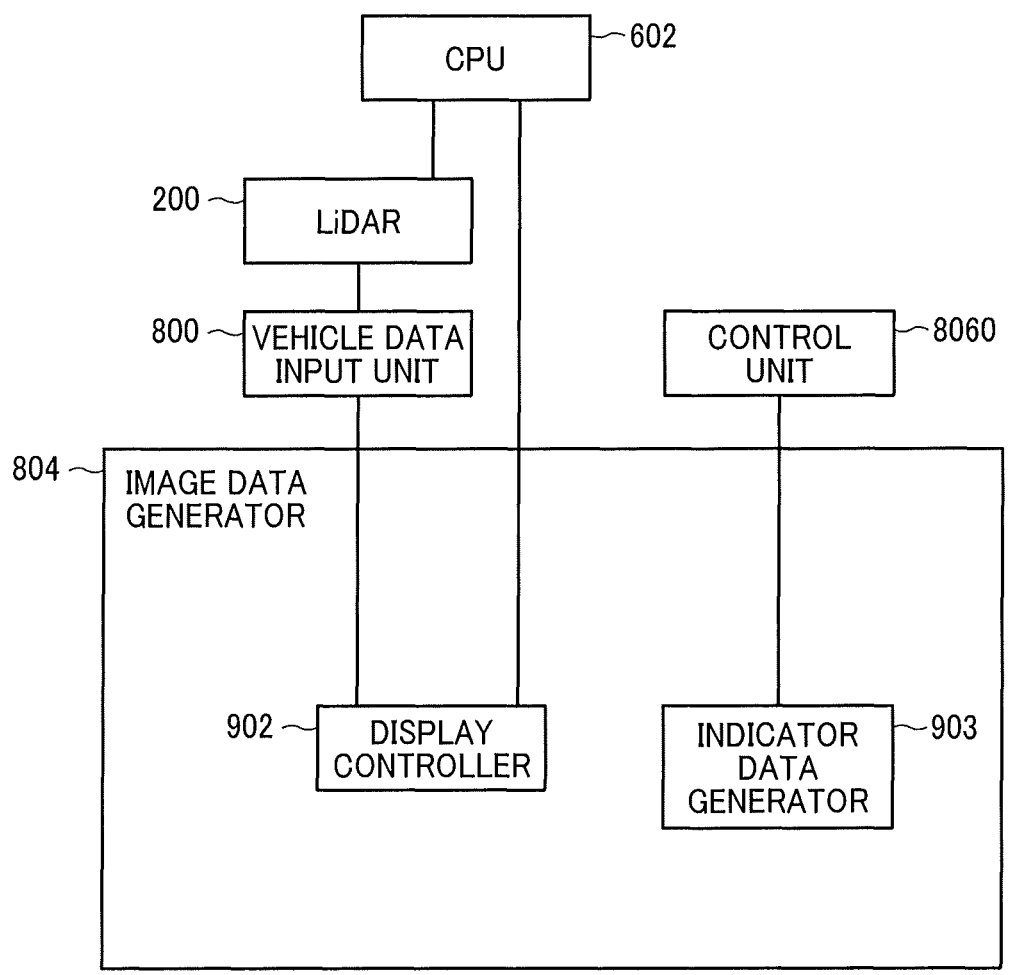
FIG. 9 is a block diagram of a configuration example of an image data generator.

To display such an indicator, the HUD 100 includes a light detection ranging device (LiDAR) 200 as a detection system to detect a position of an object and the image data generator 804 as illustrated in FIG. 9, in addition to the above-described configuration. In this case, the image data generator 804 further includes components to generate image data.

In some embodiments, the detection system is a dedicated to display an indicator. However, no limitation is intended thereby. In some other embodiments, a detector that is used for an automatic vehicle control such as an automatic brake and an automatic steering is used to display an indicator. When such a detector is used, the HUD does not include the detection system.

The detection system or the detector may be any device that is capable of detecting the presence or absence and the position of an object in front of (including diagonally in front of) the vehicle. In some embodiments, a radar that uses a light-emitting diode (LED) as the light source, a millimeter-wave radar, an infrared radar, a monocular camera, a stereo camera, or a combination thereof is used instead of the LiDAR that uses, e.g., a semiconductor laser as the light source.

The LiDAR 200 is mounted in the vicinity of, for example, a front bumper or a rearview mirror of an automobile. The LiDAR 200 outputs three-dimensional positional data (also referred to as a distance image) of the object as a detection result to the image data generator 804 via the vehicle data input unit 800.

The LiDAR 200 includes a light projecting system, a light receiving system, and a processing system. The light projection system includes at least one laser light source (for example, a semiconductor laser). The light receiving system includes at least one light receiving element (for example, a photodiode) that receives light reflected from the object projected from the light projecting system. The processing system calculates a distance to the object. The projection range of the LiDAR 200 is a predetermined range ahead of and diagonally in front of the vehicle. The range finding method of the LiDAR 200 is a direct time of flight (TOF) method of calculating the time difference between the light emitting timing of the laser light source and the light receiving timing of the light receiving element to obtain the distance to the object based on the time difference. Alternatively, in some embodiments, the range finding method of the LiDAR 200 is an indirect TOF method of dividing the received-light signal of the light receiving element into a plurality of phase signals and calculating the time difference based on the plurality of phase signals to obtain the distance to the object based on the time difference. The projection system refers to any of a scanning projection system and the non-scanning projection system.

The image data generator 804 includes a display controller 902 and an indicator data generator 903.

The display controller 902 sets an orientation of the indicator and the position at which the indicator is displayed (sometimes referred to simply as the position of the indicator or display position) within the display area, based on the detection result of the LiDAR 200. Subsequently, the display controller 902 transmits setting information of the direction and the position of the indicator to the indicator data generator 903.

The indicator data generator 903 generates image data of the indicator based on the received setting information of the direction directed by the indicator and the display position of the indicator, transmitting the image data to the control unit 8060.

The control unit 8060 controls the LD driver 6111 and the MEMS controller 615 based on the received image data of the indicator, to display the indicator as a virtual image within the display area.

With the configuration that displays an indicator indicating the position of an object (for example, another vehicle in front) within the display area overlapping the sight ahead of the vehicle of the driver as illustrated in FIGS. 10A through 10D, the driver accurately recognizes the position of the object.

In the present embodiment, the indicator is any indication sign, such as an arrow as illustrated in FIGS. 10A through 10D or a wedge, that indicates any one direction. In the present disclosure, one direction indicated by the indicator is also referred to as an "orientation of the indicator". The indicator has any size that is sufficient to indicate a direction within the display area. In FIGS. 10A through 10D, the indicator has only a two-dimensional shape indicating the two-dimensional position of an object within the plane perpendicular to the traveling direction of the vehicle of the driver. In actuality, the indicator has a three-dimensional shape indicating the two-dimensional position of the object within the plane perpendicular to the traveling direction of the vehicle as well as the one-dimensional position along the traveling direction of the vehicle, as is seen from, e.g., FIG. 13. Thus, the indicator seems to indicate the three-dimensional position of the object for a viewer such as the driver of the vehicle.

Figure 13:
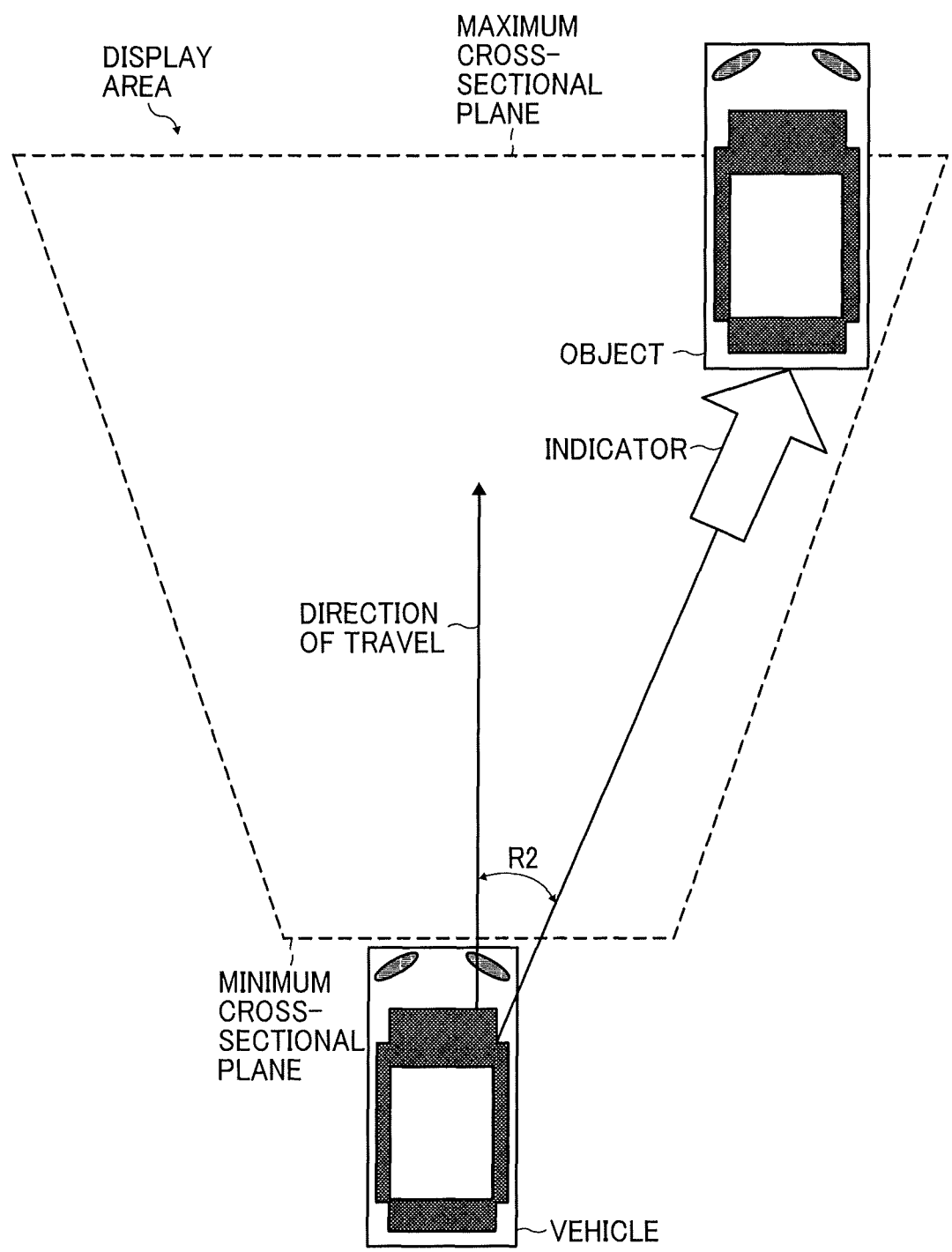
FIG. 13 is an illustration of a display example of the indicator within the display area when the object is viewed from above.

In the present embodiment, the display area has, for example, a substantially isosceles trapezoid shape that expands with an increase in distance from the vehicle as viewed from above (see, for example, FIG. 13). Further, the display area has a quadrangular pyramid shape having a rectangular cross section perpendicular to the traveling direction of the vehicle (hereinafter simply referred to as the "cross section") (see FIGS. 10A through 10D, for example). In other words, the cross section of the display area becomes larger with an increase in distance from the vehicle.

In FIGS. 10A through 10D, the indicator is oriented to the direction (including the upward component and forward component as viewed from the viewer) of the object. Further, the indicator is disposed at a position near the object within the display area.

Figure 10A:
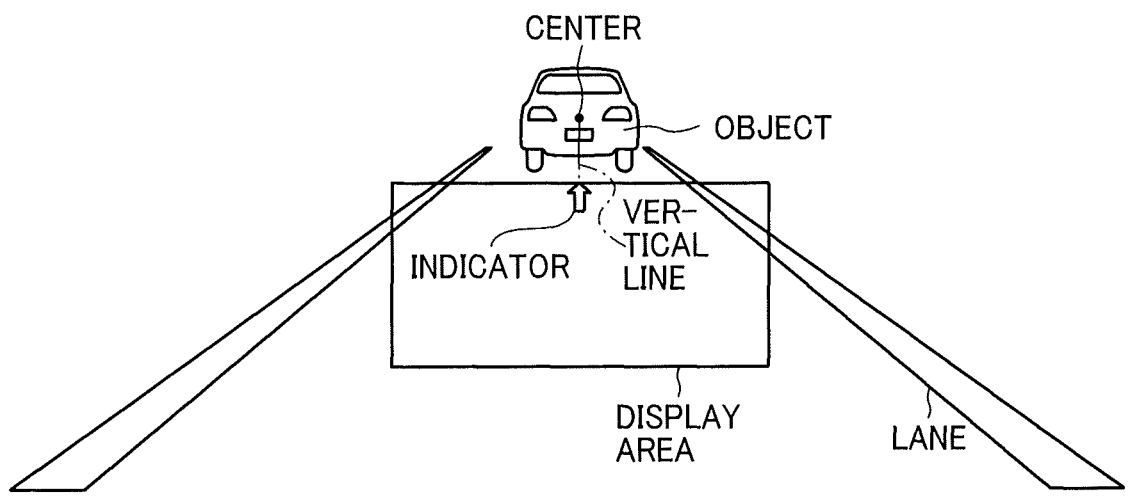
FIG. 10A through 10D are illustrations of display examples of an indicator when the object is in front of the host vehicle.
Figure 10B:
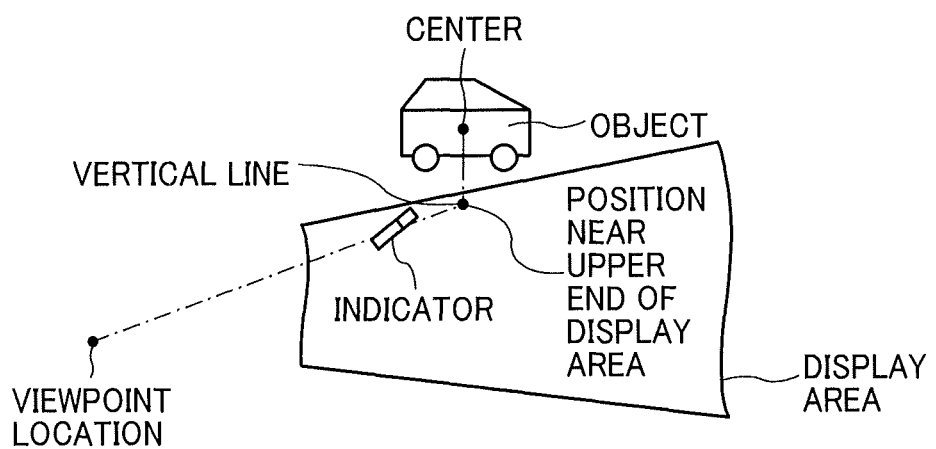
Figure 10C:
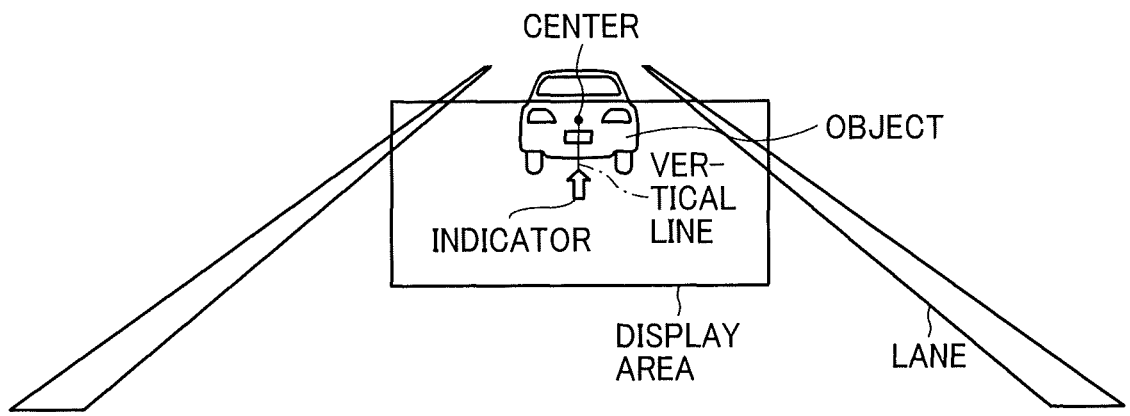
Figure 10D:
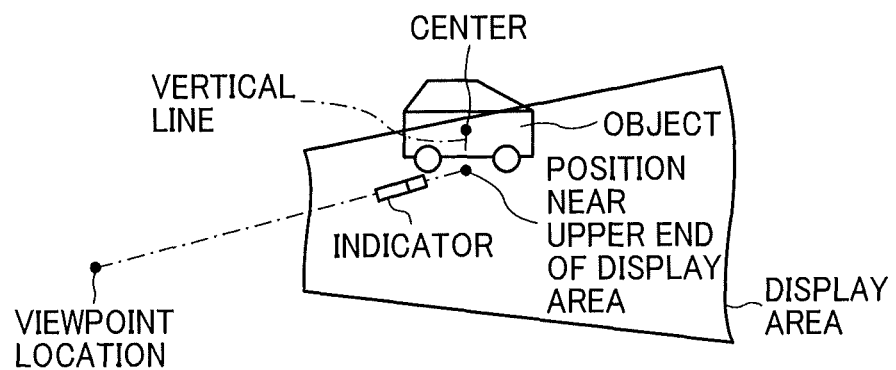

In the examples of FIGS. 10A and 10B, the object is deviated upward from the angle of view (angle of divergence) of the display area as a whole. FIG. 10A is an illustration as viewed from the viewer, and FIG. 10B is a side view of the illustration of FIG. 10A. In the examples of FIGS. 10C and 10D, the lower half of the object is within the angle of view of the display area. Note that, FIG. 10C is an illustration as viewed from the viewer, and FIG. 10D is a side view of the illustration of FIG. 10C.

In the example of FIGS. 10A and 10B, the arrow as the indicator is displayed in a line segment connecting between the viewpoint position of the viewer and the position near the upper end of the display area on the vertical line passing through the center of the object, forming an angle with respect to the line segment. The arrow indicates the direction (the direction of the arrow) that is oriented to the lower end position of the object in the vertical line passing through the center of the object.

In the example of FIGS. 10C and 10D, the arrow as the indicator is displayed in a line segment connecting between the viewpoint position of the viewer and the position near the lower end of the object on the vertical line passing through the center of the object, so as to indicate the direction (the direction of the arrow) that is parallel with the line segment.

Figure 11A:
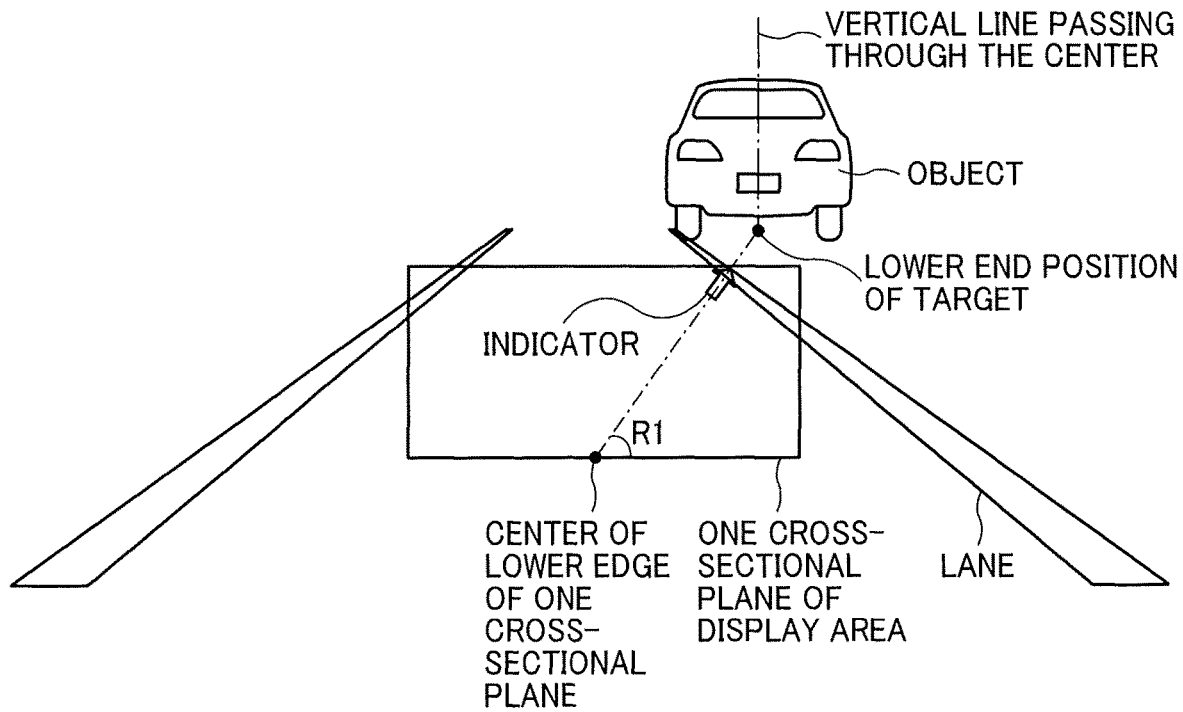
FIGS. 11A and 11B are illustrations of display examples of the indicator according to an embodiment of the present disclosure when the object is diagonally in front of the vehicle.
Figure 11B:
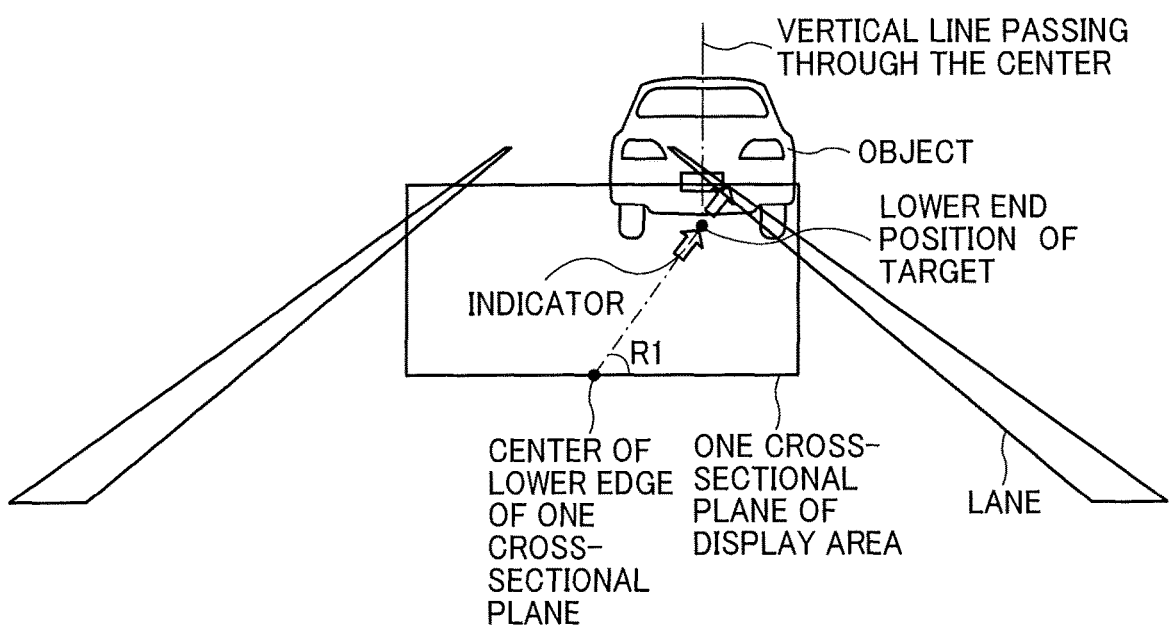

In FIGS. 11A and 11B, the indicator is oriented to the direction (including the upward component and lateral component as viewed from the viewer) of the object. Further, the indicator is disposed at a position near the object within the display area.

FIG. 11A is an illustration of an example in which the object is deviated diagonally upward from the angle of view of the display area as a whole when viewed from the viewer. FIG. 11B is an illustration of an example in which the lower left part of the object is within the angle of view of the display area when viewed from the viewer.

In the example of FIG. 11A, the arrow as the indicator is displayed on a line segment connecting between the viewpoint position of the viewer and the position near the upper end of the display area on the vertical line passing through the center of the object (a line segment forming an angle R1 with respect to the horizontal direction when viewed from the viewer), forming an angle with respect to the line segment. In this case, the arrow indicates the direction (the direction of the arrow) that is oriented to the lower end position of the object on the vertical line passing through the center of the object. The angle R1 is an angle in the direction of roll of the vehicle of the driver.

In the example of FIG. 11B, the arrow as the indicator is displayed in a line segment connecting between the viewpoint position of the viewer and the lower end position of the object on the vertical line passing through the center of the object (a line segment forming an angle R1 with respect to the horizontal direction when viewed from the viewer), so as to indicate the direction (the direction of the arrow) that is parallel with the line segment.

Figure 12A:
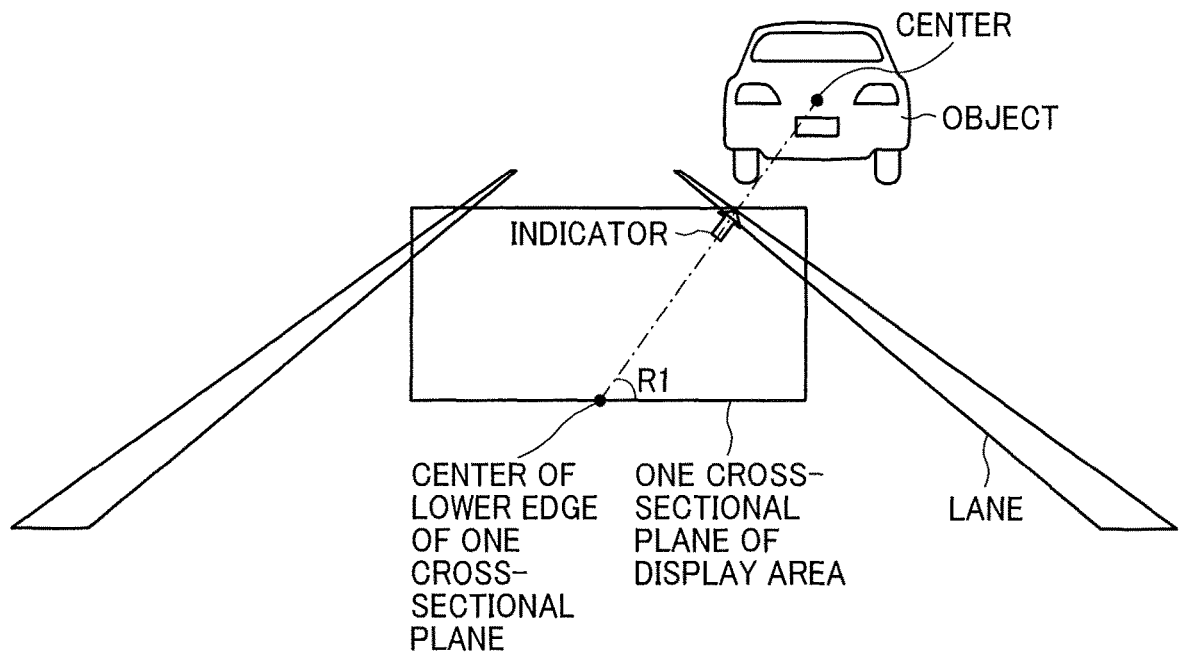
FIGS. 12A and 12B are illustrations of display examples of the indicator according to another embodiment of the present disclosure when the object is diagonally in front of the vehicle.
Figure 12B:
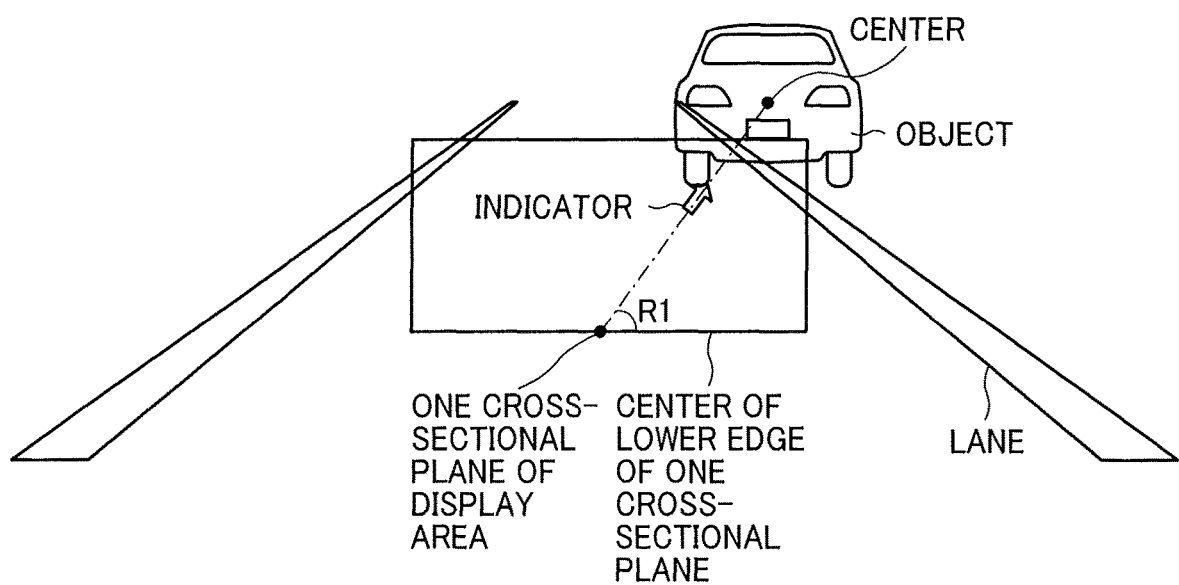

In FIGS. 12A and 12B, the indicator is oriented to the direction (including the upward component and lateral component as viewed from the viewer) of the object. Further, the indicator is disposed at a position near the object within the display area.

FIG. 12A is an illustration of an example in which the object is deviated diagonally upward from the angle of view of the display area as a whole when viewed from the viewer. FIG. 12B is an illustration of an example in which the lower left part of the object is within the angle of view of the display area when viewed from the viewer.

In the example of FIG. 12A, the arrow as the indicator is displayed on a line segment connecting between the viewpoint position of the viewer and the center of the object (a line segment forming an angle R1 with respect to the horizontal direction when viewed from the viewer), so as to indicate the direction (the direction of the arrow) that is oriented to the center of the object. The angle R1 is an angle in the direction of roll of the vehicle of the driver.

In the example of FIG. 12B, the arrow as the indicator is displayed on a line segment connecting between the viewpoint position of the viewer and the center of the object (a line segment forming an angle R1 with respect to the horizontal direction when viewed from the viewer), so as to indicate the direction (the direction of the arrow) that is parallel with the line segment.

FIG. 13 is an illustration of an example in which the object is obliquely in front of the vehicle and the posterior half of the object is within the display area when viewed from above. In FIG. 13, the indicator is displayed on a line segment forming an angle R2 with respect to the traveling direction of the vehicle (a line segment connecting between the viewpoint position of the viewer and the posterior end of the object) when viewed from above. In this case, the indicator indicates the direction parallel to the line segment. The angle R2 is an angle in the yaw direction of the driver.

Figure 14:
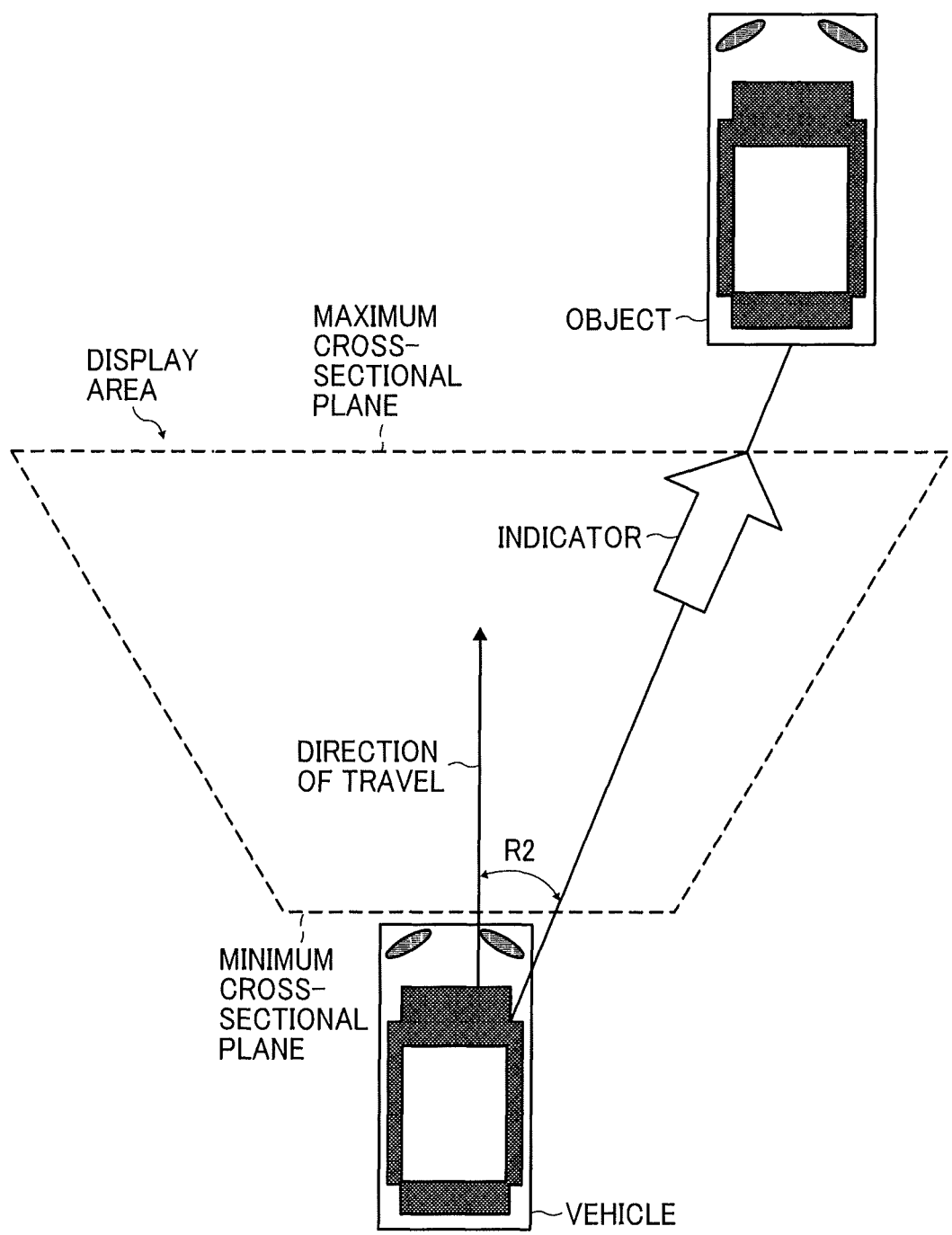
FIG. 14 is an illustration of a display example of the indicator outside the display area when the object is viewed from above.

FIG. 14 is an illustration of an example in which the object is obliquely in front of the vehicle and in front of the display area when viewed from above. In FIG. 14, the indicator is displayed on a line segment forming an angle R2 with respect to the traveling direction of the vehicle (a line segment connecting between the viewpoint position of the viewer and the posterior end of the object) when viewed from above. In this case, the indicator indicates the direction parallel to the line segment.

As illustrated in FIGS. 13 and 14, when at least a part of the object falls within the angle of view (angle of divergence) of the display area, the image data generator 804 sets the orientation and position of the indicator, using the distance from the vehicle to the object, the angle R2, and the angle R1 (see FIGS. 11 and 12). In this case, the angle R1 and the angle R2 are obtained from the direction of the line segment connecting the viewpoint position of the viewer and the object.

Figure 15:
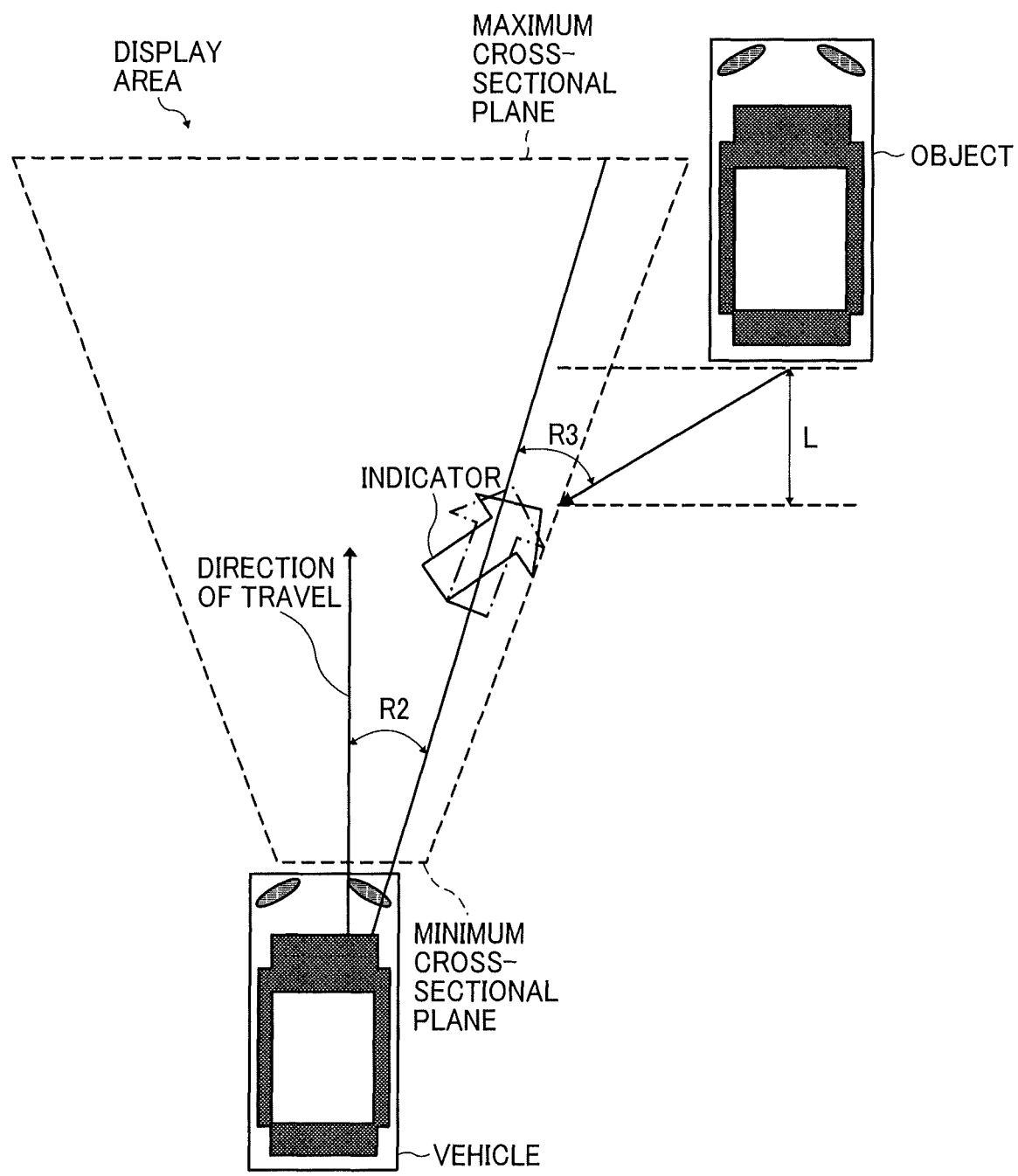
FIG. 15 is an illustration of a display example of the indicator outside the display area when the object is viewed from above and the viewer.

FIG. 15 is an illustration of an example in which the object is obliquely in front of the vehicle and next to the display area when viewed from above. In FIG. 15, the indicator is displayed on a line segment forming an angle R2 with respect to the traveling direction of the vehicle, such that the indicator indicates the direction forming an angle R3 with respect to the line segment (the indicator indicates the posterior end of the object) when viewed from above. In this configuration, the object is deviated from the angle of view of the display area. In such a case, the image data generator 804 sets the direction and position of the indicator, using the distance from the vehicle to the object, the angle R1, the angle R2, and the angle R3. The angle R3 is an angle in the yaw direction of the driver. In addition, the indicator is stretched and displayed when rotated by the angle R3 in the real space, which hampers visual recognition of the indicator. Accordingly, the indicator is preferably rotated by the angle R3 within a template image before projection into the real space.

In the present embodiment, the distance L from the front end of the indicator to the posterior end of the object is preliminarily determined as a design value. The angle R1, the angle R2, and the angle R3 are determined such that the indicator falls within the display area while satisfying the condition of the design value.

Figure 16A:
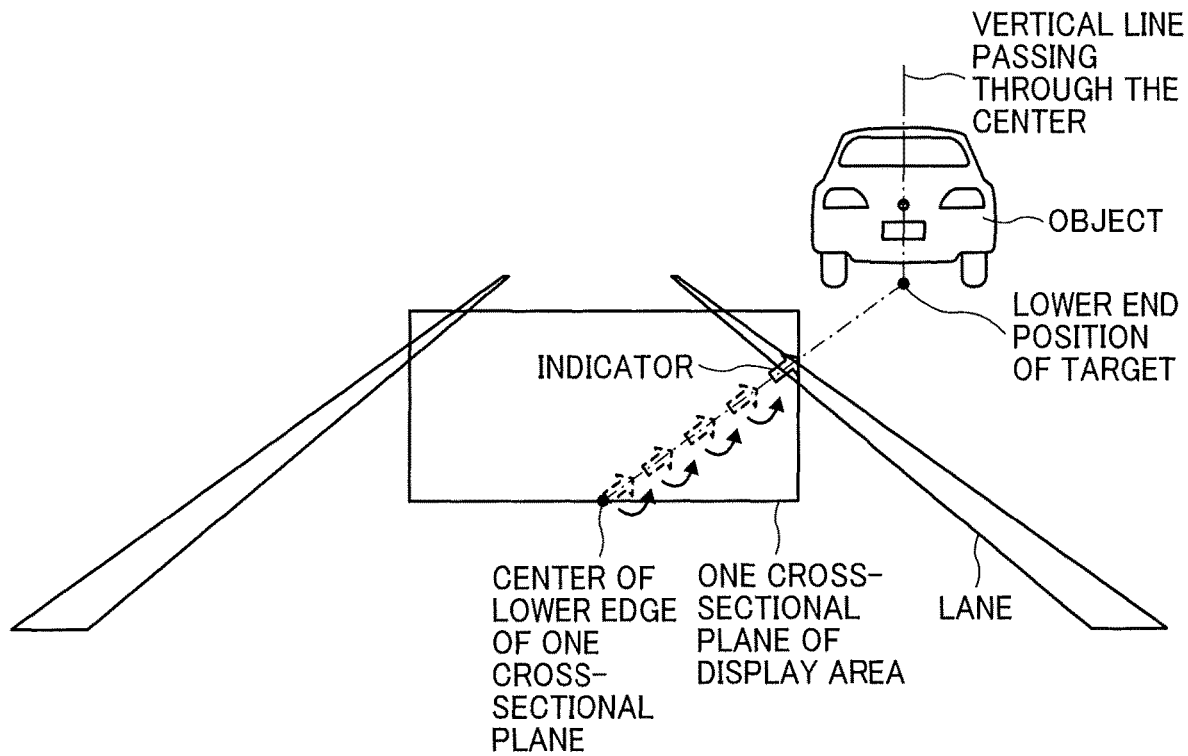
FIGS. 16A and 16B are illustrations for describing an example in which the indicator is continuously moved and displayed.
Figure 16B:
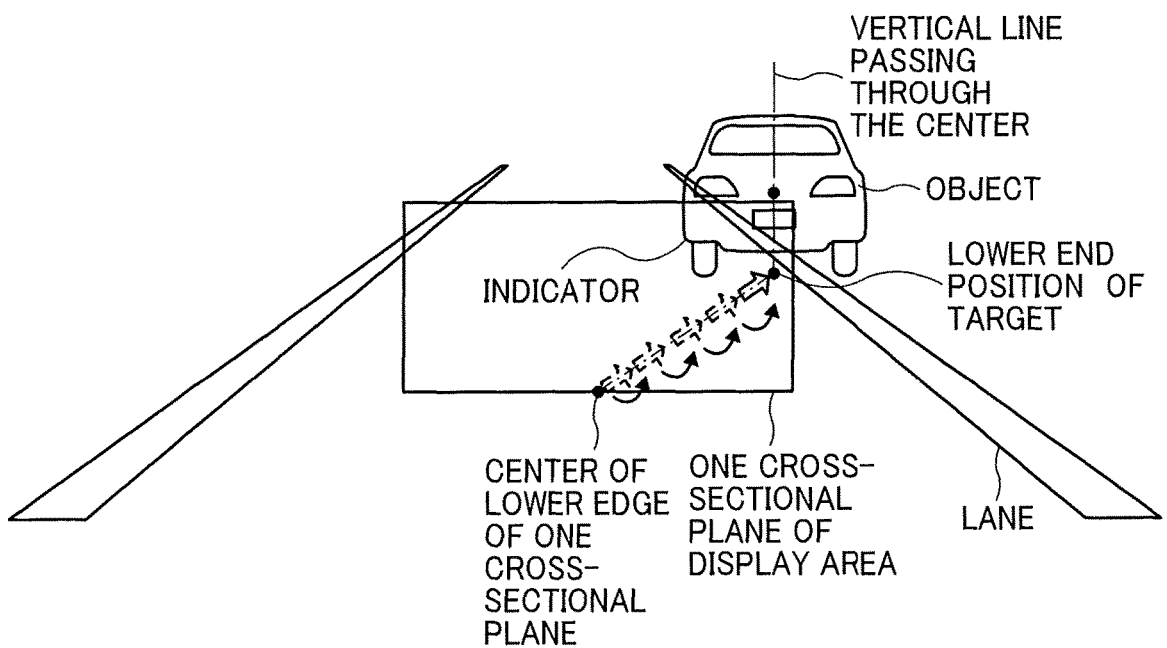

As illustrated in FIG. 16A and FIG. 16B for example, the HUD 100 shifts the indicator from the reference position to a position close to the object (hereinafter, referred to as a proximity position) to stop the indicator at the proximity position within the display area when displaying the indicator for the first time, or when switching from non-display to display after switching from display to non-display. This configuration allows the viewer to feel the ease of recognition of the position at which the object has been detected.

Figure 17:
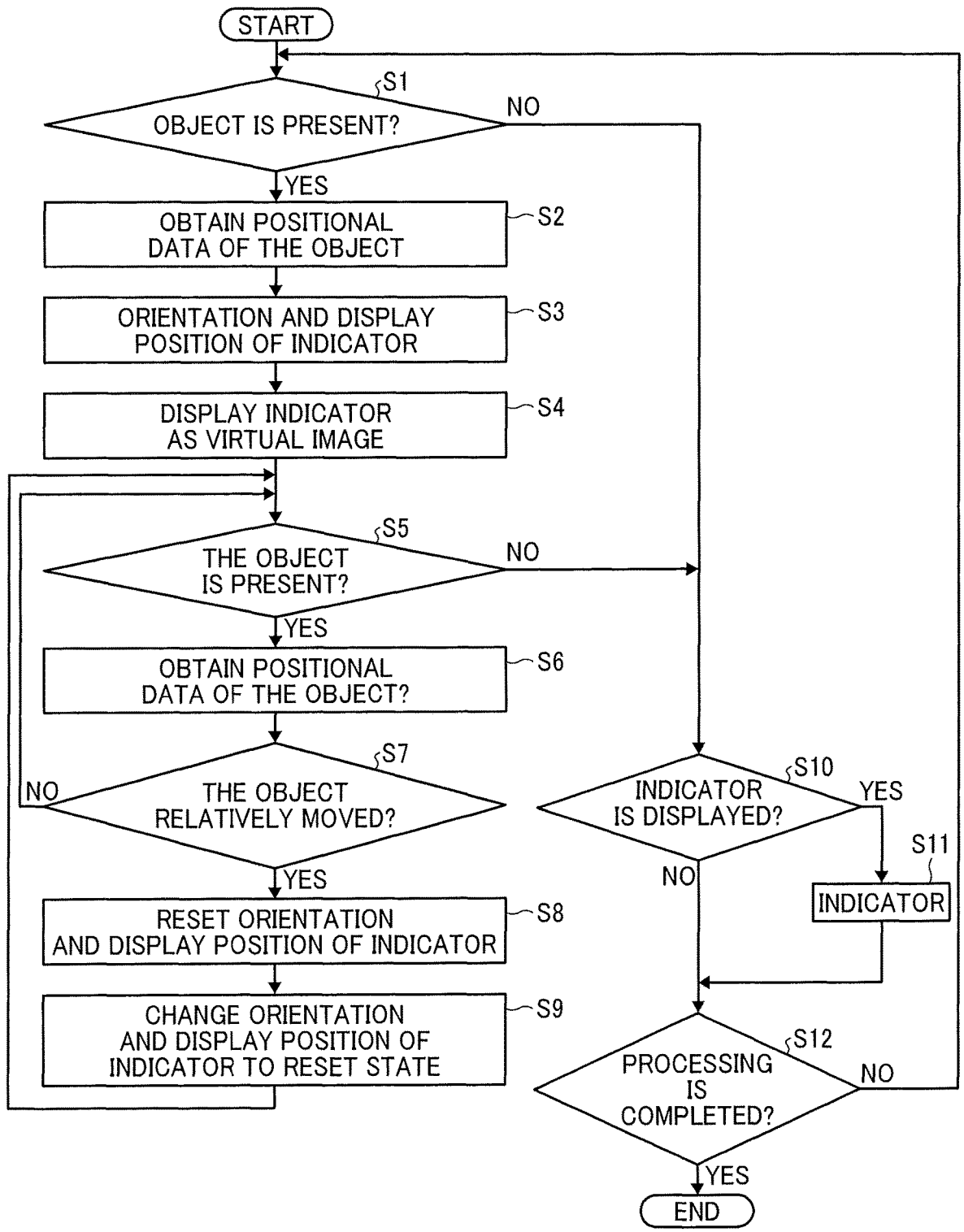
FIG. 17 is a flowchart for describing display processing 1.

Next, a description is given of display processing 1 performed by the HUD 100 according to the present embodiment, with referring to FIG. 17. FIG. 17 is a flowchart of a computational algorithm executed by the CPU 602 according to the present embodiment. The display processing 1 starts when the electrical system of a vehicle mounted with the HUD 100 is turned on.

In the first step S1, the CPU 602 determines whether any object is present. More specifically, the CPU 602 determines that an object is present in response to a reception of a detection result representing the presence of an object, from the LiDAR 200. When an affirmative determination is made in step S1, the process proceeds to step S2. When a negative determination is made in step S1, the process proceeds to step S10.

In step S2, the CPU 602 obtains the positional data of the object. More specifically, the CPU 602 controls the LiDAR 200 to detect the three-dimensional positional data of the object, and transmit the three-dimensional positional data to the display controller 902 and the CPU 602. The CPU 602 stores the received three-dimensional positional data of the object in the RAM 606.

In the next step S3, the CPU 602 sets the orientation and display position of the indicator. More specifically, the CPU 602 controls the display controller 902 to set the orientation and display position of the indicator based on the received three-dimensional positional data of the object, and transmit the set information to the indicator data generator 903. The CPU 602 further controls the indicator data generator 903 to generate data regarding indicator (hereinafter, referred to as indicator data) that includes information regarding the orientation and display position of the indicator in the received set data and the shifting path of the indicator from the reference position to the display position. Then, the CPU 602 controls the indicator data generator 903 to transmit the indicator data to the control unit 8060.

In the next step S4, the CPU 602 displays the indicator as a virtual image. More specifically, the CPU 602 controls the control unit 8060 to control the LD driver 6111 and the MEMS controller 615 to display the indicator as a virtual image within the display area, based on the received data. At this time, the indicator is first displayed at the reference point, and is linearly shifted toward the display position within the display area, to stop at the display position.

In the next step S5, the CPU 602 determines whether the object is present. More specifically, when the CPU 602 determines that the object is present in response to a reception of the detection result representing the presence of the object, from the LiDAR 200. When an affirmative determination is made in step S5, the process proceeds to step S6. When a negative determination is made in step S5, the process proceeds to step S10.

In step S6, the CPU 602 obtains the positional data of the object. More specifically, the CPU 602 controls the LiDAR 200 to detect the three-dimensional positional data of the object, and transmit the three-dimensional positional data to the CPU 602. The CPU 602 stores the received three-dimensional positional data of the object in the RAM 606.

In the next step S7, the CPU 602 determines whether the object has moved relative to the vehicle of the driver. More specifically, the CPU 602 determines whether an object has moved by comparing the previously-obtained three-dimensional positional data and the newly-obtained three-dimensional positional data. For example, when the vehicle of the driver is stopped and the object is either one of a moving object at rest and a still object, the object is not moving relative to the vehicle. Further, when the vehicle moves at the same speed in the same direction as those of the object, the object is also not moving relative to the vehicle. When an affirmative determination is made in step S7, the process proceeds to step S8. When a negative determination is made in step S7, the process returns to step S5.

Figure 18:
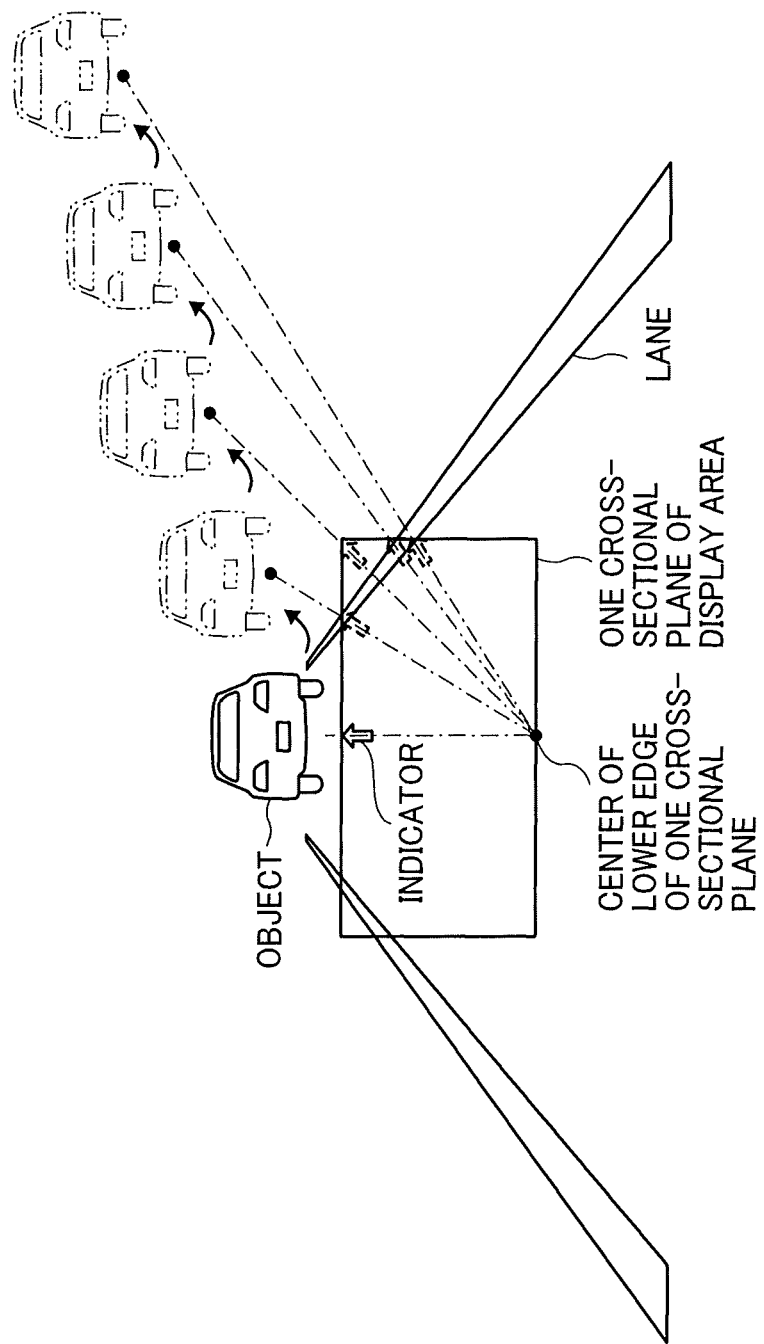
FIG. 18 is an illustration for describing an example in which the position and orientation of the indicator changes with the position of the same object.

In step S8, the CPU 602 resets the orientation and display position of the indicator. More specifically, the CPU 602 transmits the latest three-dimensional positional data of the object to the display controller 902. More specifically, the CPU 602 controls the display controller 902 to reset the orientation and display position of the indicator based on the received latest three-dimensional positional data of the object, and transmit the reset data to the indicator data generator 903. The CPU 602 further controls the indicator data generator 903 to generate indicator data, and transmit the indicator data to the control unit 8060. The indicator data generated by the indicator data generator 903 includes information regarding the orientation and display position of the indicator in the received set data; the shifting path of the indicator from the current display position to the reset display position of the indicator; and an orientation of the indicator in the shifting path (see FIG. 18). FIG. 18 is an illustration of a specific example in which the indicator is shifted with movement of the identical object. The initial object and indicator are represented by the solid line. The object (of which display position is reset) and indicator for each reset are represented by virtual lines.

In step S9, the CPU 602 shifts the orientation and display position of the indicator to those reset. More specifically, the CPU 602 controls the control unit 8060 to control the LD driver 6111 and the MEMS controller 615 to shift the indicator while changing the orientation thereof so as to display the indicator that indicates the reset direction at the reset display position, within the display area, based on the received indicator data (see FIG. 18). Once the step S9 is performed, the process returns to the step S5.

In step S10, the CPU 602 determines whether the indicator is displayed. When an affirmative determination is made in step S10, the process proceeds to step S11. When a negative determination is made in step S10, the process proceeds to step S12.

In step S11, the CPU 602 hides the indicator. This is because, when any object to be indicated is absent, no indicator is displayed so as to prevent erroneous recognition of an object. More specifically, the CPU 602 transmits a request for hiding an indicator to the control unit 8060. Upon the reception of the request for hiding the indicator, the control unit 8060 ceases displaying the indicator. When step S11 is completed, the process proceeds to step S12.

In step S12, the CPU 602 determines whether the processing is completed. When an affirmative determination is made in step S12, the processing flow ends. When a negative determination is made in step S12, the process returns to step S1. In the present embodiment, the processing is continued when the electrical system of a vehicle (the vehicle of the driver) mounted with the HUD 100 remains turned on, and the processing ends when the electrical system is turned off.

The above-described display processing 1 assumes the cases in which a single object is present. However, in reality, there is a plurality of objects in many cases. In such cases, the object to be indicated by the indicator is switched with the relative position of the plurality of objects and the vehicle of the driver. Considering such a case, a description is given of display processing 2 that assumes the cases in which a plurality of objects is present in addition to the cases in which a single object is present.

Figure 19B:
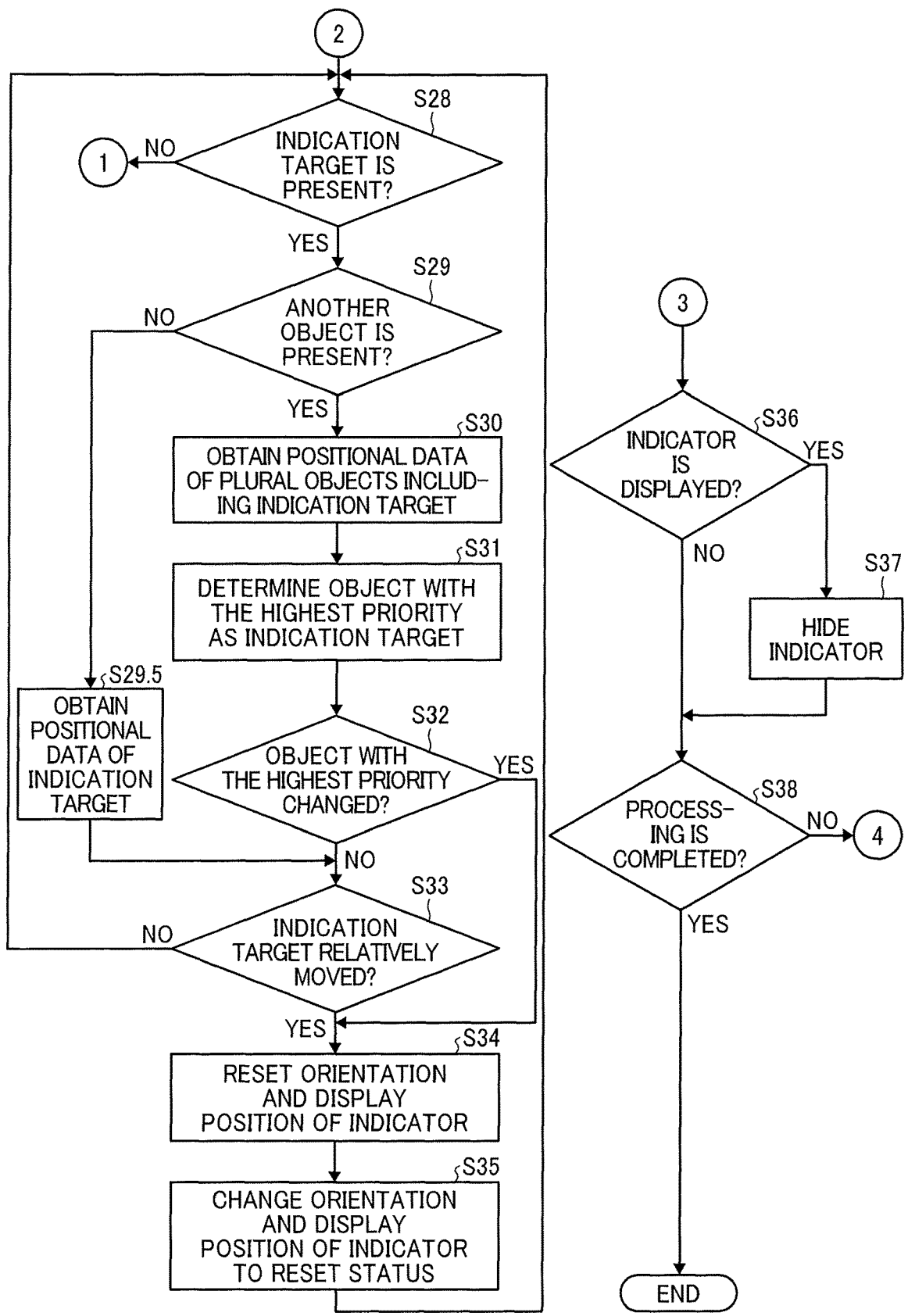

Next, a description is given of display processing 2 performed by the HUD 100 according to the present embodiment, with referring to FIGS. 19A and 19B. The flowcharts of FIGS. 19A and 19B are based on a computational algorithm executed by the CPU 602 according to the present embodiment. The display processing 2 starts when the electrical system of a vehicle mounted with the HUD 100 is turned on.

In the first step S21, the CPU 602 determines whether any object is present. More specifically, the CPU 602 determines that an object is present in response to a reception of a detection result representing the presence of an object, from the LiDAR 200. When an affirmative determination is made in step S21, the process proceeds to step S22. When a negative determination is made in step S21, the process proceeds to step S36.

In step S22, the CPU 602 determines whether a plurality of objects is present. More specifically, when the detection result received from the LiDAR 200 in step S21 represents the presence of a plurality of objects, the CPU 602 determines that a plurality of objects is present. When the received detection result represents the presence of a single object, the CPU 602 determines that a single object is present. When an affirmative determination is made in step S22, the process proceeds to step S23. When a negative determination is made in step S22, the process proceeds to step S24.

In step S23, the CPU 602 obtains the positional data of the plurality of objects. More specifically, the CPU 602 controls the LiDAR 200 to detect the three-dimensional positional data of the plurality of objects, and transmit the three-dimensional positional data of the plurality of objects to the CPU 602. The CPU 602 stores the received three-dimensional positional data of the plurality of objects in the RAM 606. When step S23 is completed, the process proceeds to step S25.

In step S24, the CPU 602 determines only one object as an object to be indicated by the indicator (an indication target), and obtains the positional data thereof. More specifically, the CPU 602 controls the LiDAR 200 to detect the three-dimensional positional data of the indication target, and transmit the three-dimensional positional data to the display controller 902 and the CPU 602. The CPU 602 stores the received three-dimensional positional data of the indication target in the RAM 606. When step S24 is completed, the process proceeds to step S26.

In step S25, the CPU 602 determines the object with the first priority to be indicated by the indicator as the object to be indicated, and reads the positional data thereof. As a method of determining the object with the first priority to be indicated by the indicator, the CPU 602 determines, for example, an object closest to the vehicle of the driver among the objects within the same lane as that of the vehicle of the driver (e.g., vehicles ahead of the vehicle of the driver), as an object with the first priority to be indicated (see FIGS. 20A, 20B, and 20C), based on the three-dimensional positional data of the plurality of objects obtained in step S23. Alternatively, in some embodiments, the CPU 602 determines an object closest to the vehicle of the driver (e.g., another object, a pedestrian, or an obstacle) as the object with the first priority to be indicated (see FIGS. 21A, 21B, 21C), based on the three-dimensional positional data of the plurality of objects obtained in step S23. After determining the object to be indicated (indication target), the CPU 602 reads out the three-dimensional positional data of the object to be indicated from the RAM 606 and transmits the read three-dimensional positional data to the display controller 902. When step S25 is completed, the process proceeds to step S26.

In step S26, the CPU 602 sets the orientation and display position of the indicator. More specifically, the CPU 602 controls the display controller 902 to set the orientation and display position of the indicator based on the received three-dimensional positional data of the indication target, and transmit the set data to the indicator data generator 903. The CPU 602 further controls the indicator data generator 903 to generate data regarding indicator that includes information regarding the orientation and display position of the indicator in the received set data and the shifting path of the indicator from the reference position to the display position. Then, the CPU 602 controls the indicator data generator 903 to transmit the indicator data to the control unit 8060.

In the next step S27, the CPU 602 displays indicator as a virtual image. More specifically, the CPU 602 controls the control unit 8060 to control the LD driver 6111 and the MEMS controller 615 to display the indicator as a virtual image within the display area, based on the received indicator data. At this time, the indicator is first displayed at the reference point, and is linearly shifted toward the display position within the display area, stopping at the display position.

In the next step S28, the CPU 602 determines whether an indication target is present. More specifically, the CPU 602 determines that an indication target is present in response to a reception of a detection result representing the presence of the indication target, from the LiDAR 200. When an affirmative determination is made in step S28, the process proceeds to step S29. When a negative determination is made in step S28, the process returns to step S21.

In step S29, the CPU 602 determines whether another object is present. More specifically, the CPU 602 determines that another object is present in response to a reception of a detection result representing the presence of another object, from the LiDAR 200. When an affirmative determination is made in step S29, the process proceeds to step S30. When a negative determination is made in step S29, the process proceeds to step S29.5.

In step S29.5, the CPU 602 obtains the positional data of the indication target. More specifically, the CPU 602 controls the LiDAR 200 to detect the three-dimensional positional data of the indication target, and transmit the three-dimensional positional data to the CPU 602. The CPU 602 stores the received three-dimensional positional data of the object to be indicated in the RAM 606. When step S29.5 is completed, the process proceeds to step S33.

In step S30, the CPU 602 obtains the positional data of a plurality of objects that includes an indication target. More specifically, the CPU 602 controls the LiDAR 200 to detect the three-dimensional positional data of the plurality of objects that includes the indication target, and transmit the detected three-dimensional positional data to the CPU 602. When step S30 is completed, the process proceeds to step S31.

In step S31, the CPU 602 determines an object with the first priority to be indicated by the indicator as the indication target. As a method of determining the object with the first priority to be indicated by the indicator, the CPU 602 determines an object closest to the vehicle of the driver among the objects within the same lane as that of the vehicle of the driver (e.g., vehicles ahead of the vehicle of the driver), as an object with the first priority to be indicated (see FIGS. 20A, 20B, and 20C). Alternatively, in some embodiments, the CPU 602 determines an object closest to the vehicle of the driver (e.g., another object, a pedestrian, or an obstacle) as the object with the first priority to be indicated (see FIGS. 21A, 21B, 21C). When step S31 is completed, the process proceeds to step S32.

In step S32, the CPU 602 determines whether it is determined whether the object with the first priority to be indicated has been changed. In other words, the CPU 602 determines whether the indication target has been changed. When an affirmative determination is made in step S32, the process proceeds to step S34. When a negative determination is made in step S32, the process proceeds to step S33.

In step S33, the CPU 602 determines whether the indication target has moved relative to the vehicle of the driver. More specifically, the CPU 602 determines whether the indication target has moved by comparing the previously-obtained three-dimensional positional data and the newly-obtained three-dimensional positional data of the object to be indicated. When an affirmative determination is made in step S33, the process proceeds to step S34. When a negative determination is made in step S33, the process returns to step S28.

In step S34, the CPU 602 resets the orientation and display position of the indicator. More specifically, the CPU 602 reads the latest three-dimensional positional data of the indication target, from the RAM 606, and transmits the read data to the display controller 902. More specifically, the CPU 602 controls the display controller 902 to reset the orientation and display position of the indicator based on the received latest three-dimensional positional data of the indication target, and transmit the set information to the indicator data generator 903. The CPU 602 further controls the indicator data generator 903 to generate indicator data, and transmit the indicator data to the control unit 8060. The indicator data generated by the indicator data generator 903 includes information regarding the orientation and display position of the indicator in the received set data; the shifting path of the indicator from the current display position to the reset display position of the indicator; and an orientation of the indicator in the shifting path (see FIGS. 18, 22A, and 22B). When step S34 is completed, the process proceeds to step S35.

In step S35, the CPU 602 shifts the orientation and display position of the indicator to the reset orientation and display position. More specifically, the CPU 602 controls the control unit 8060 to control the LD driver 6111 and the MEMS controller 615 to shift the indicator while changing the orientation thereof so as to display the indicator that indicates the reset direction at the reset display position, within the display area, based on the received indicator data (see FIGS. 18, 22A, and 22B). When step S35 is completed, the process returns to step S28.

In step S36, the CPU 602 determines whether the indicator is displayed. When an affirmative determination is made in step S36, the process proceeds to step S37. When a negative determination is made in step S36, the process proceeds to step S38.

In step S37, the CPU 602 hides the indicator. This is because, when any object to be indicated is absent, no indicator is displayed so as to prevent erroneous recognition of an object. More specifically, the CPU 602 transmits a request for hiding an indicator to the control unit 8060. Upon the reception of the request for hiding the indicator, the control unit 8060 ceases displaying the indicator. When step S37 is completed, the process proceeds to step S38.

In step S38, the CPU 602 determines whether the processing is completed. When an affirmative determination is made in step S38, the processing flow ends. When a negative determination is made in step S38, the process returns to step S21. In the present embodiment, the processing is continued when the electrical system of a vehicle (the vehicle of the driver) mounted with the HUD 100 remains turned on, and the processing ends when the electrical system is turned off.

A supplementary description is given below of the display processing 2 with reference to FIGS. 20A, 20B, 20C, 21A, 21B, 21C, 22A, and 22B.

Figure 20A:
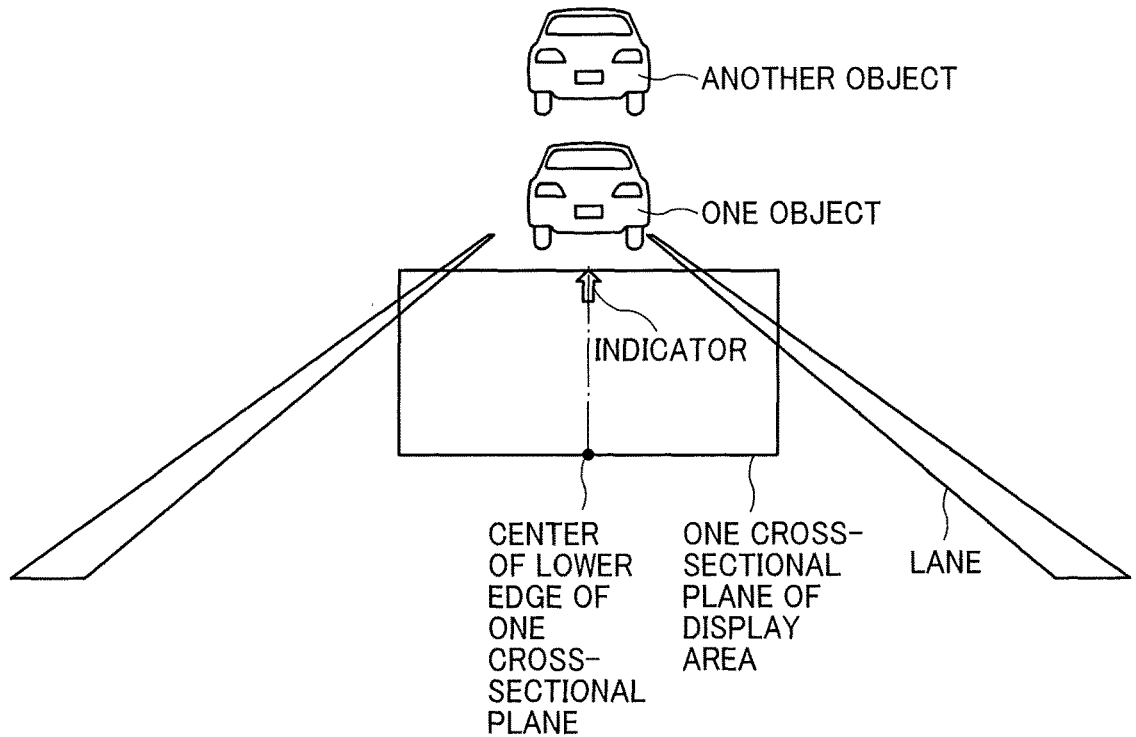
FIGS. 20A through 20C are illustrations of an example in which an indication target is switched when a plurality of objects is present.
Figure 20B:
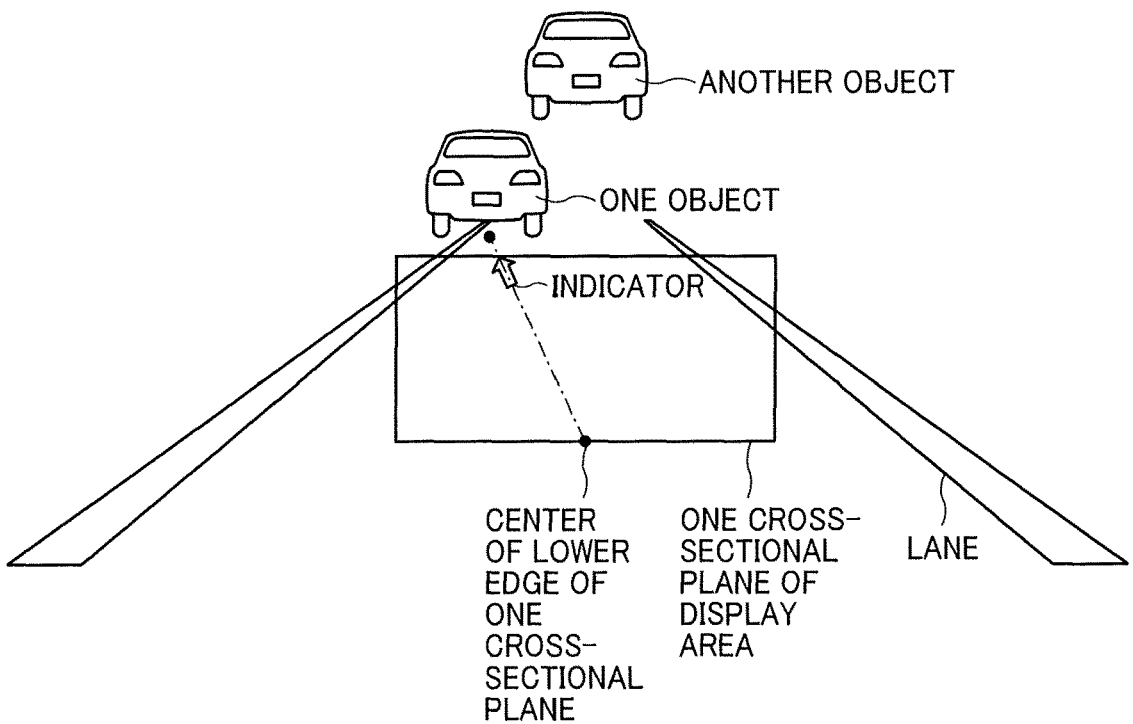
Figure 20C:
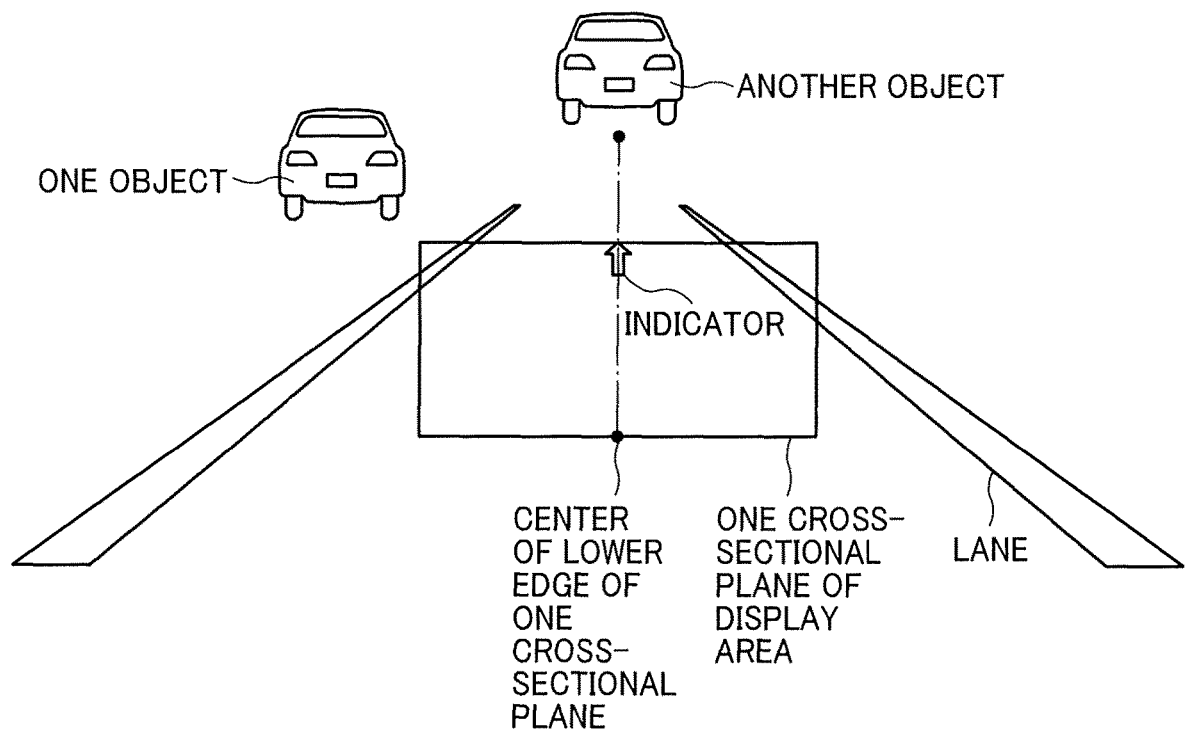

FIGS. 20A, 20B, and 20C are illustrations of a specific example of procedure for switching the indication target from one object to another object in the case in which the object closest to the vehicle of the driver is determined as the object with the first priority to be indicated, among the objects (for example, vehicles ahead of the vehicle of the driver) within the same lane.

Figure 21A:
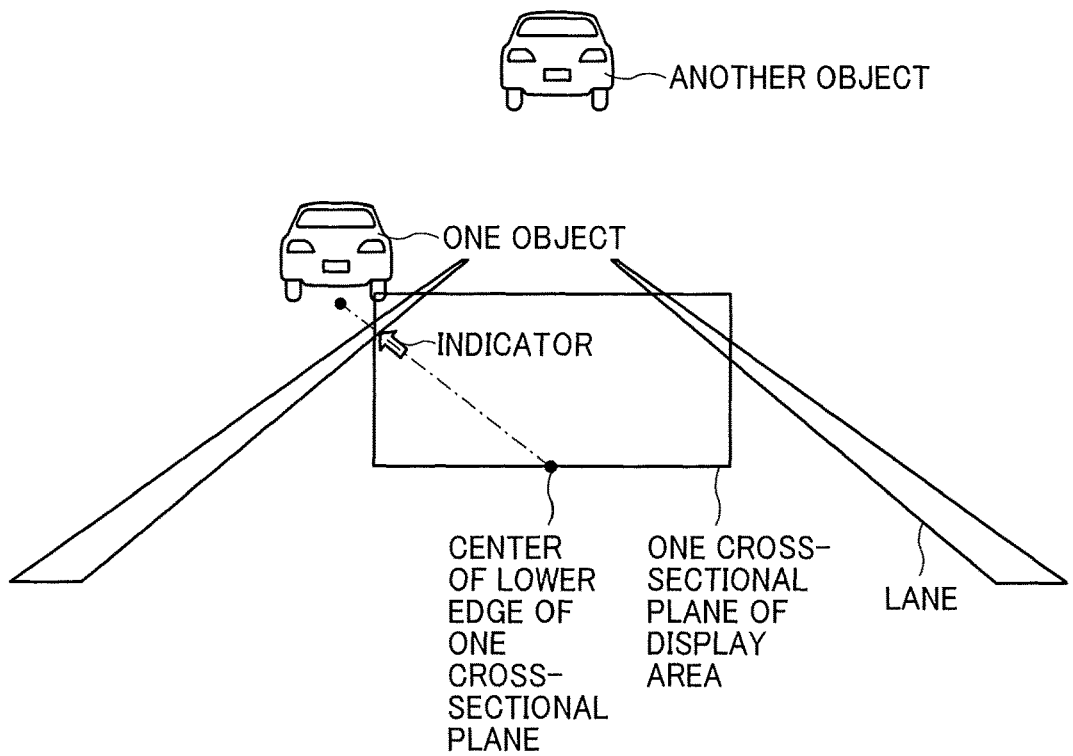
FIGS. 21A through 21C are illustrations of an example in which an indication target is switched when a plurality of objects is present.
Figure 21B:
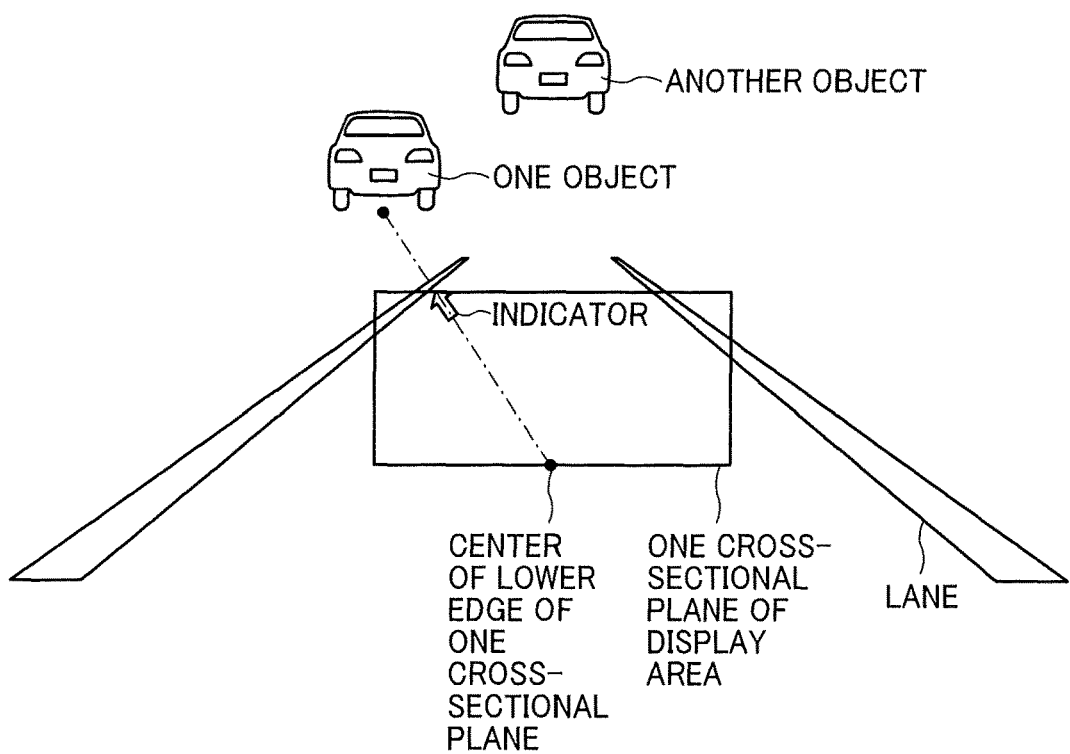
Figure 21C:
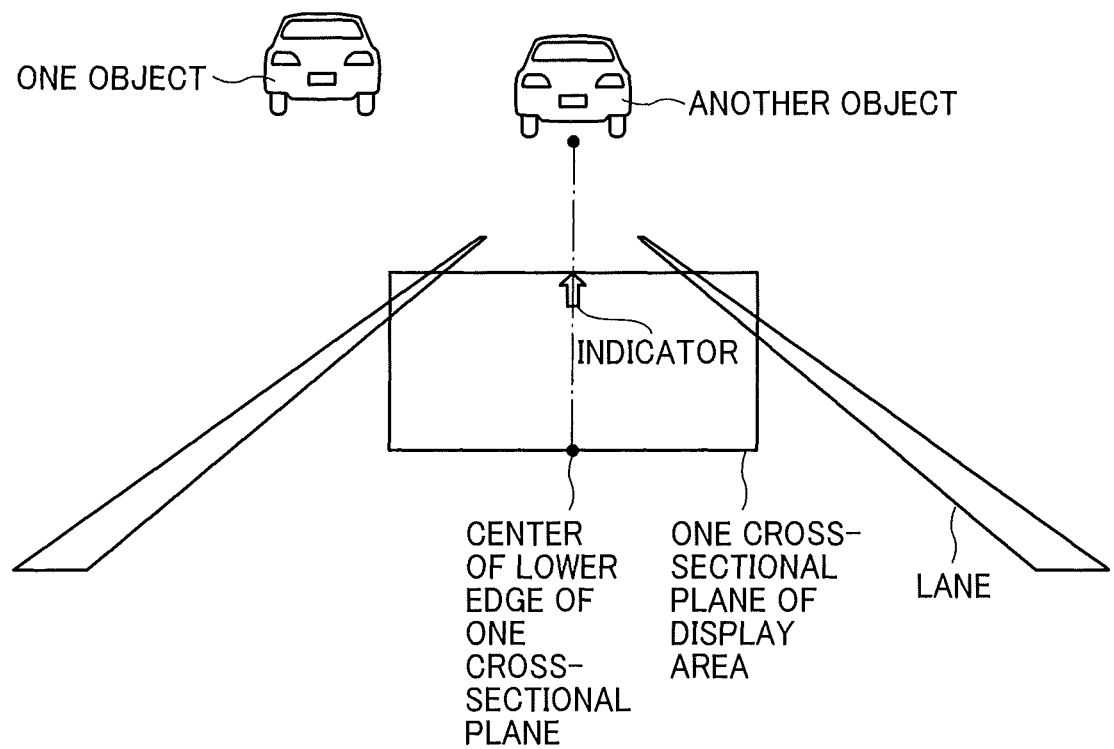

FIGS. 21A, 21B, and 21C are illustrations of a specific example of procedure for switching the indication target from one object to another object to be indicated by the indicator in the case in which the object (for example, another vehicle, a pedestrian, or an obstacle) closest to the vehicle of the driver is determined as the object with the first priority to be indicated by the indicator.

Figure 22A:
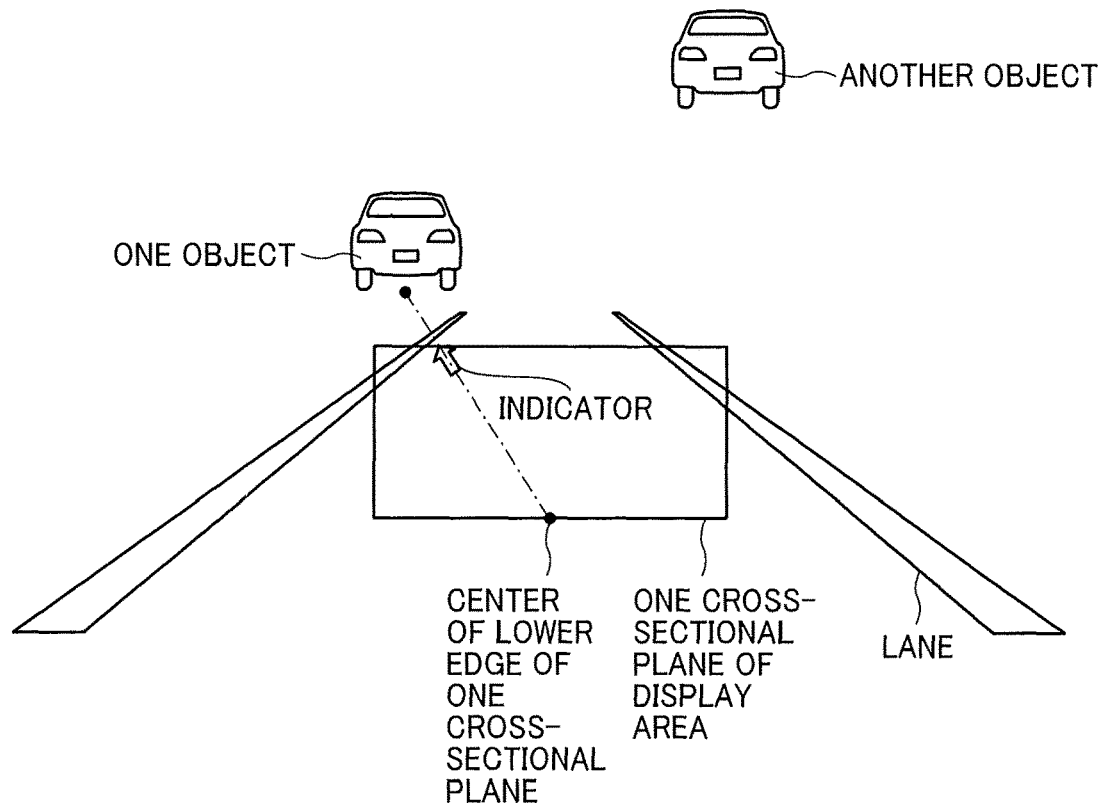
FIGS. 22A and 22B are illustrations for describing a method of shifting the indicator to change the indication target when a plurality of objects is present.
Figure 22B:
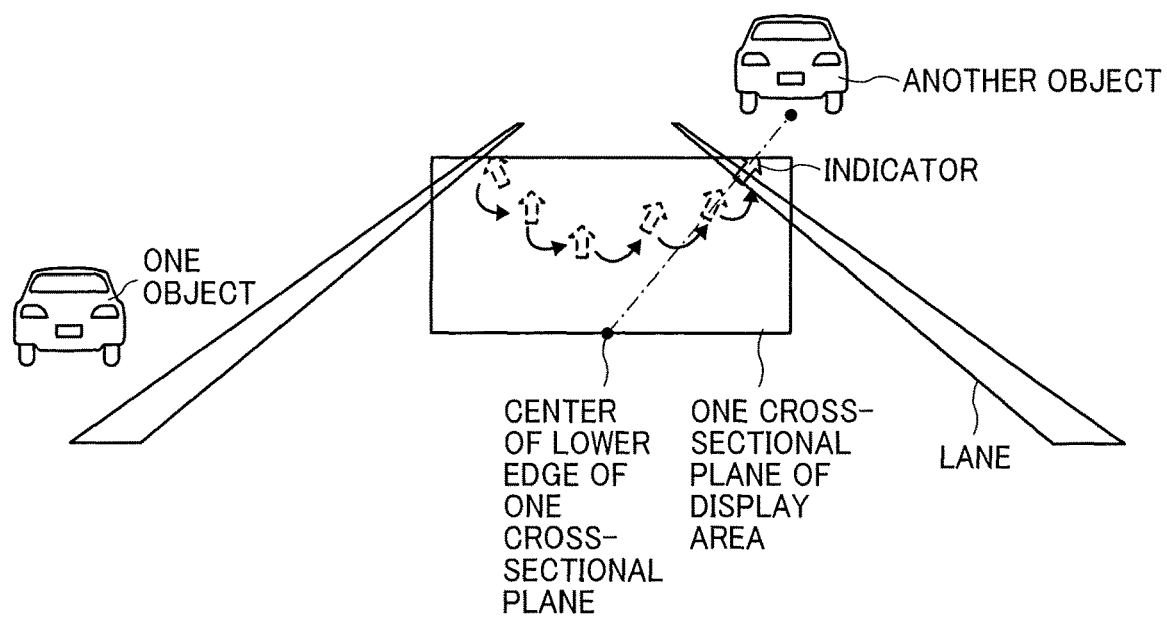

FIGS. 22A and 22B are illustrations of a specific example of steps for shifting (moving) a state of indicating one object to another state of indicating another object by the indicator in the case in which the object (for example, another vehicle, a pedestrian, or an obstacle) closest to the vehicle of the driver is determined as the object with the first priority to be indicated by the indicator.

In FIG. 22B, the orientation of the indicator gradually changes along the shifting path. In some embodiments, the indicator changes the orientation at one time at the display position before or after the reset. Further, in FIG. 22B, the shifting path of the indicator is curved. In some embodiments, the shifting path is a straight line. The same description applies to the shifting path and the orientation in the shifting path in FIG. 18 as those of FIG. 22B.

Figure 23A:
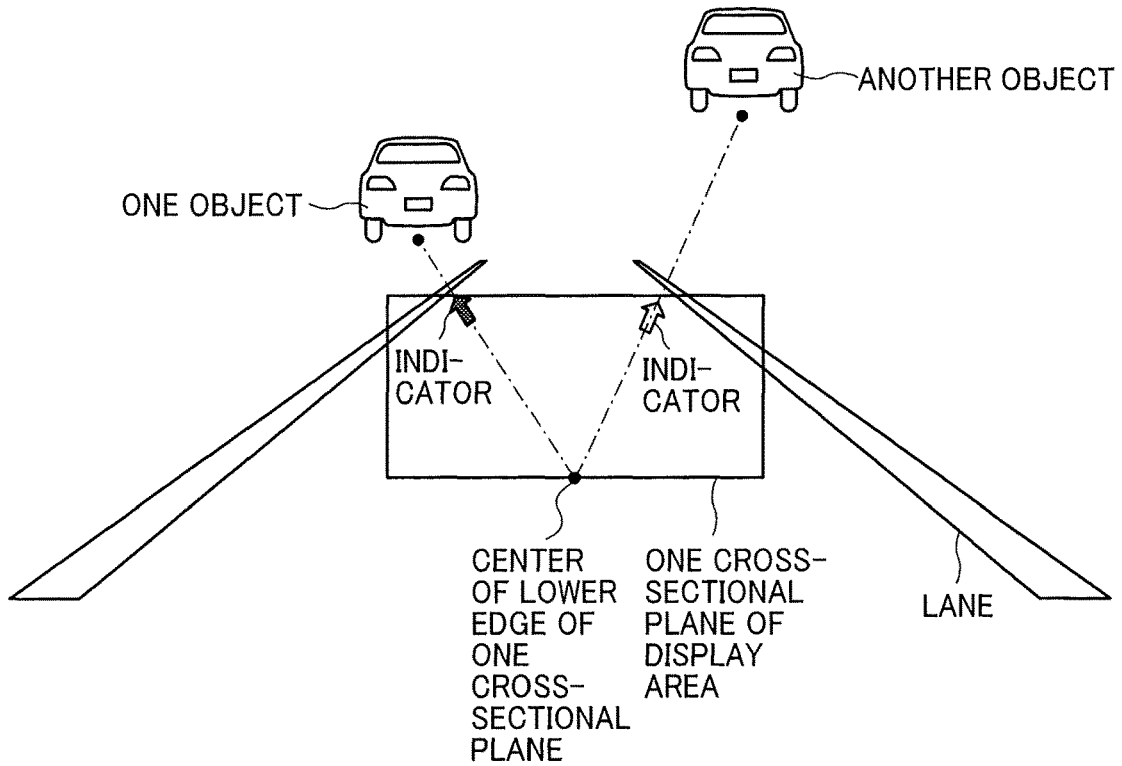
FIGS. 23A and 23B are illustrations for describing an example in which a plurality of indicators indicates a plurality of objects, respectively.
Figure 23B:
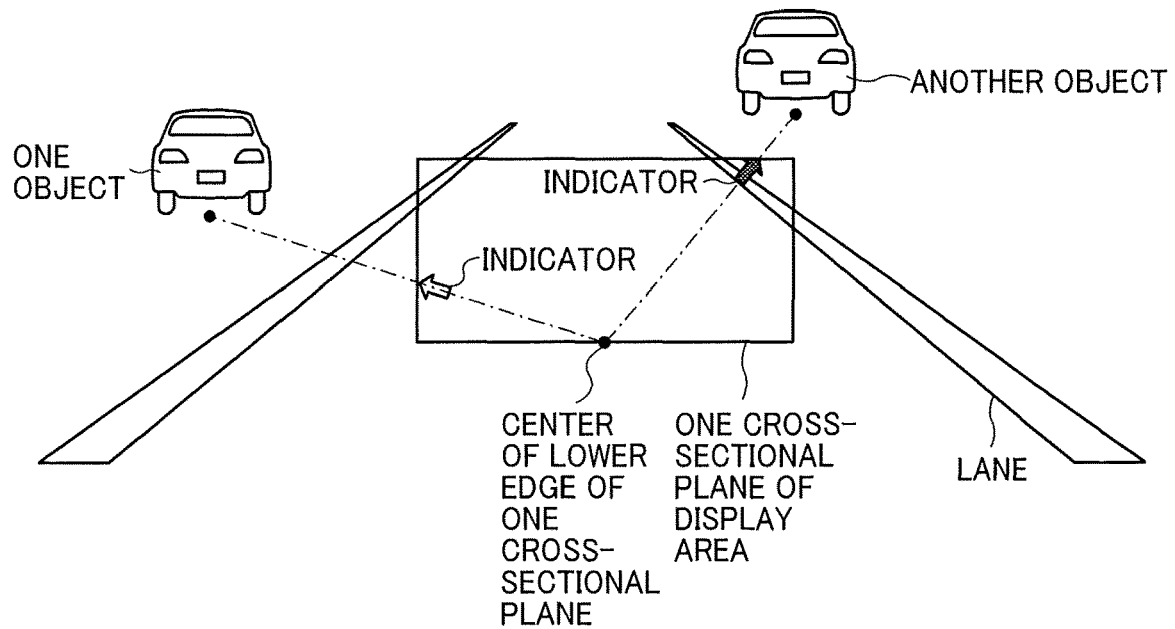

In the above description, the cases where a single indicator is displayed in the display area, and the orientation and display position of the indicator change with the position of the object are described. However, no limitation is intended therein. Thus, alternatively, in some embodiments, with a plurality of (e.g., two) objects present in the display area, a plurality of (e.g., two) indicators are displayed showing the orientations and display positions of objects (see FIGS. 23A and 23B). In this case, a first indicator indicates a first object (one object) and a second indicator indicates a second object (second object). The first object indicated by the first indicator has a higher priority than the second object indicated by the second indicator does. Thus, for example, the first indicator is highlighted more than the second indicator does (FIGS. 23A and 23B). In FIG. 23A, the first indicator that indicates the first object with the higher priority (in this case, the object closer to the vehicle of the driver) is represented as a solid arrow. The second indicator that indicates the second object with a lower priority (the object far away from the vehicle of the driver) is represented as an outlined arrow. In FIG. 23B, the second indicator indicates the second object with a higher priority (in this case, the object closer to the vehicle of the driver) than the first object indicated by the first indicator does. The first indicator indicates the first object with a lower priority (the object far away from the vehicle of the driver) than the second object does. The second indicator is represented as a solid arrow, and the first indicator is represented as an outlined arrow. In other words, when the priority order of one object and another object is reversed, i.e., the state is changed from the state of FIG. 23A to the state of FIG. 23B, an indicator following one object is changed from the solid arrow to the outlined arrow, and another indicator following another object is changed from the outlined arrow to the solid arrow. In some embodiments, the color of the arrow is changed with a reverse in priority order. In some other embodiments, the size, such as length or width, of the arrow is changed with a change in priority order. In still some other embodiments, the color tone of the arrow is changed with a change in priority order. In even some other embodiments, the type of line (e.g., a solid line or a virtual line) of the arrow is changed with a change in priority order.

As illustrated in FIGS. 24A, 24B, 25A, and 25B, an indicator is rotated around, e.g., the reference point (for example, the center of lower edge of one cross-sectional plane of the display area) as the axis according to a movement of the same object or a change in priority order of objects. In some embodiments, for example, the reference point is the center of gravity of the indicator, and the indicator is rotated around the center of gravity as the axis.

Figure 24A:
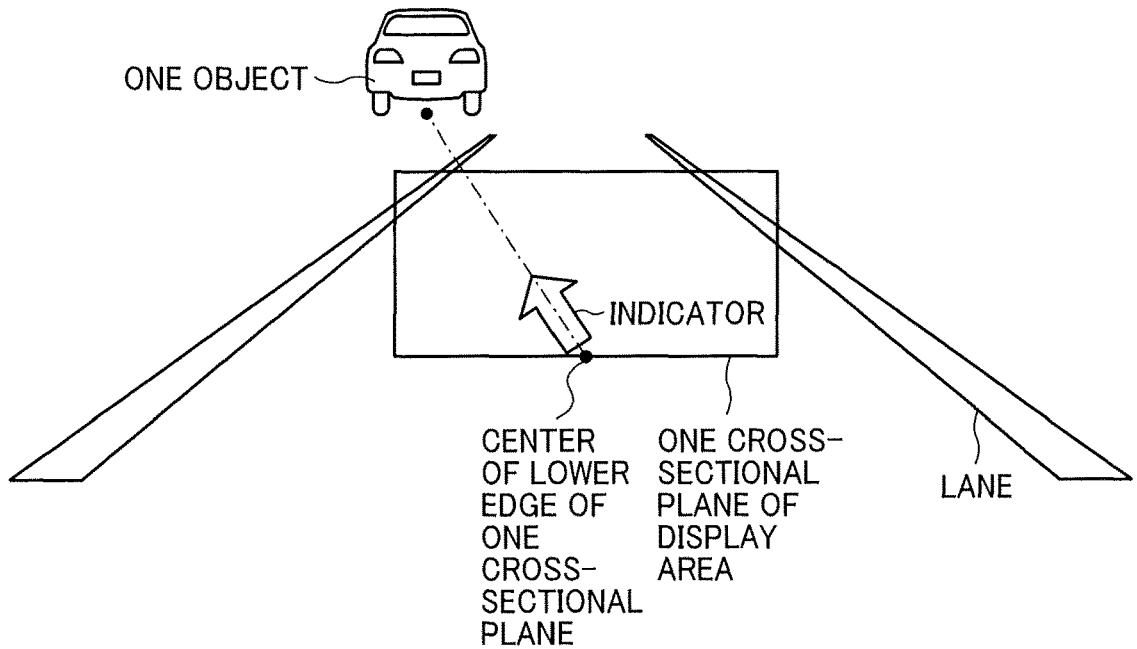
FIGS. 24A and 24B are illustrations for describing an example in which the orientation of the indicator changes with the position of the same object.
Figure 24B:
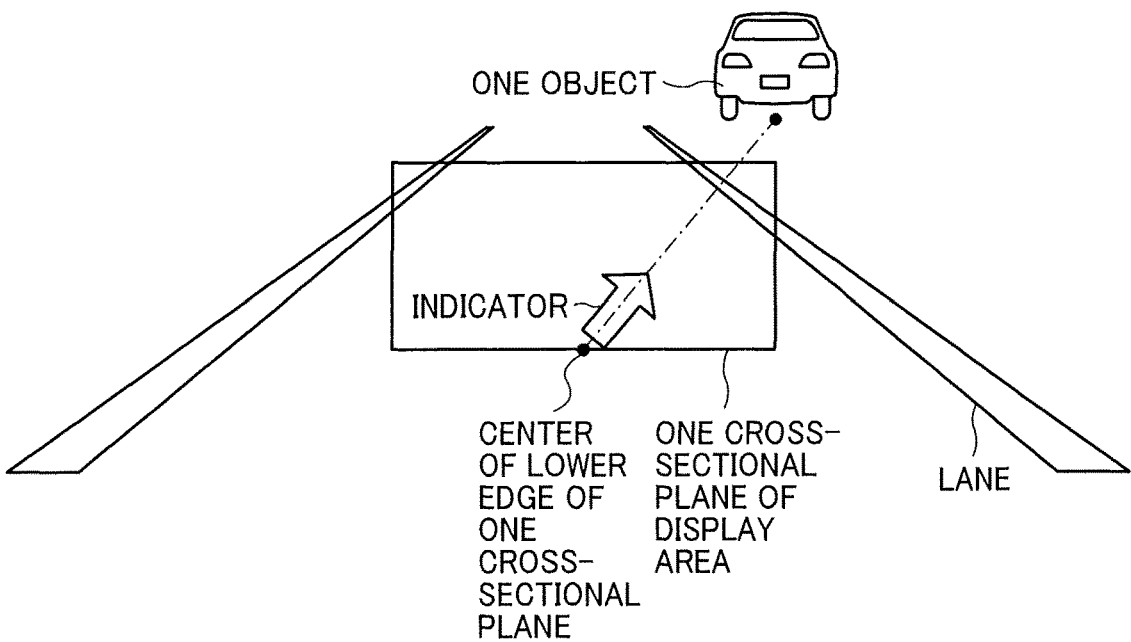

FIGS. 24A and 24B are illustrations of examples in which the indicator is rotated around the reference point as the axis according to a movement of the same object.

Figure 25A:
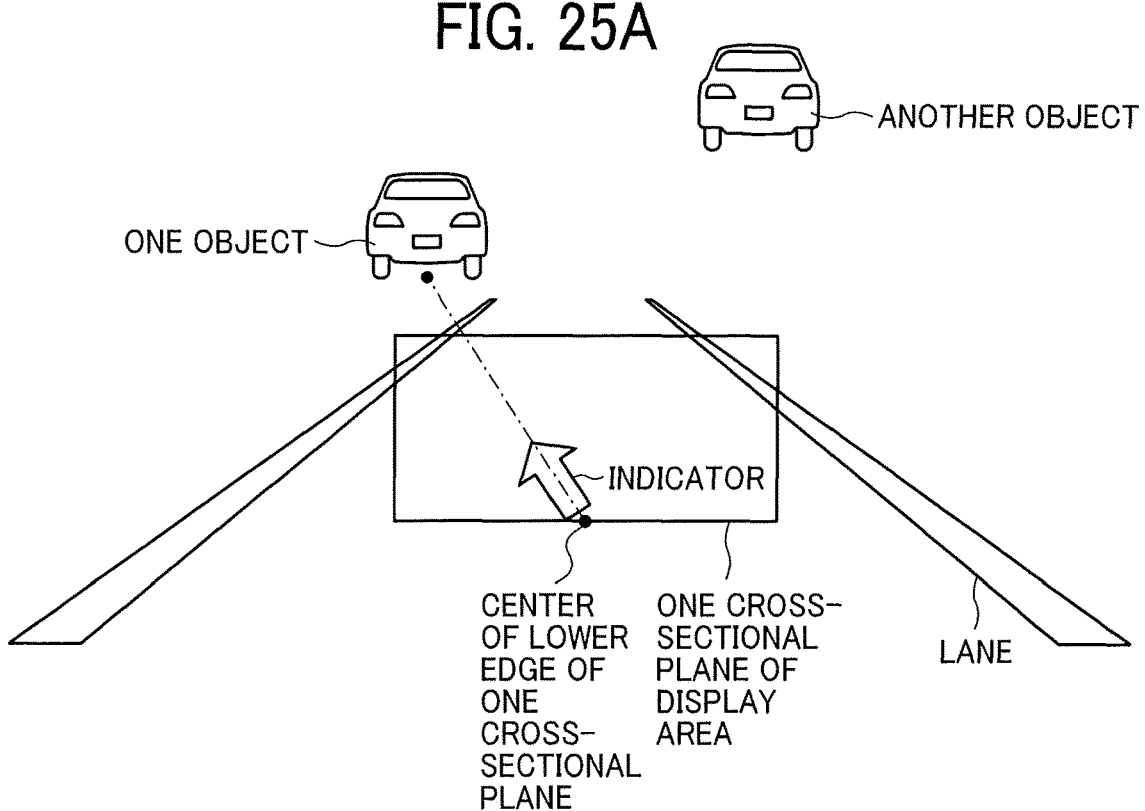
FIGS. 25A and 25B are illustrations for describing an example in which the orientation of the indicator is switched when a plurality of object is present.
Figure 25B:
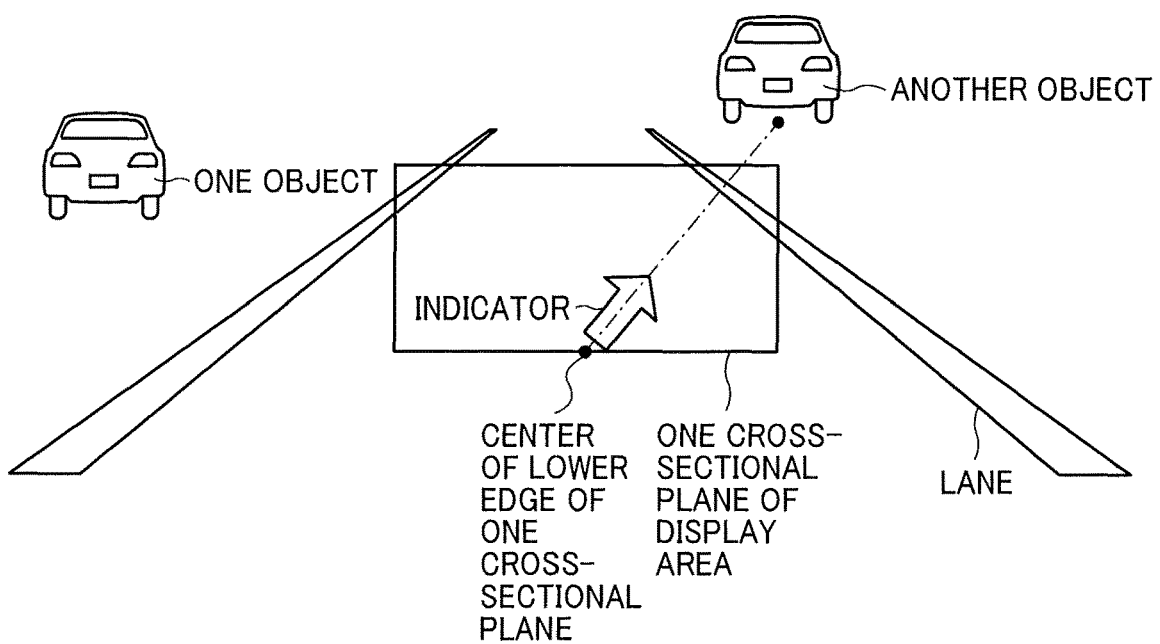

FIGS. 25A and 25B are illustrations of an example in which the indicator is rotated around the reference point as the axis to change the orientation from a direction to indicate one object to another direction to indicate another object.

Figure 26A:
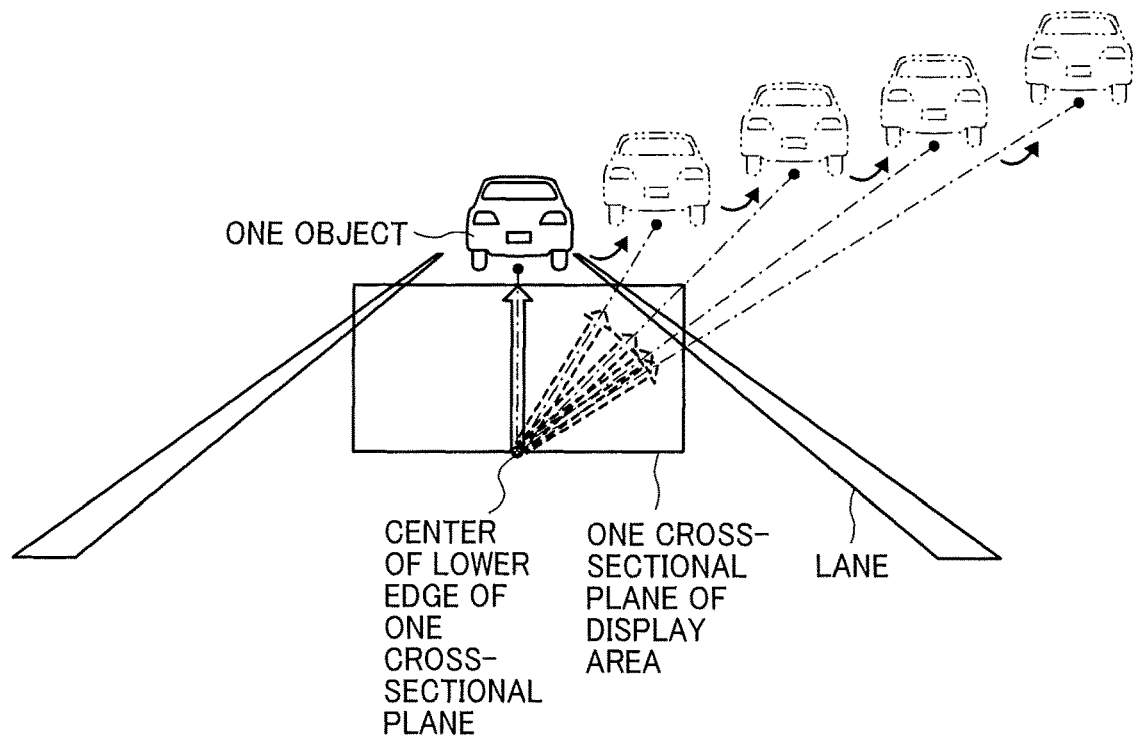
FIG. 26A is an illustration for describing an example in which the orientation of the indicator changes with the continuous changes in position of the same object.

FIG. 26A is an illustration of an example in which the indicator is rotated around the reference point as the axis to continuously follow the movement of the same object.

Figure 26B:
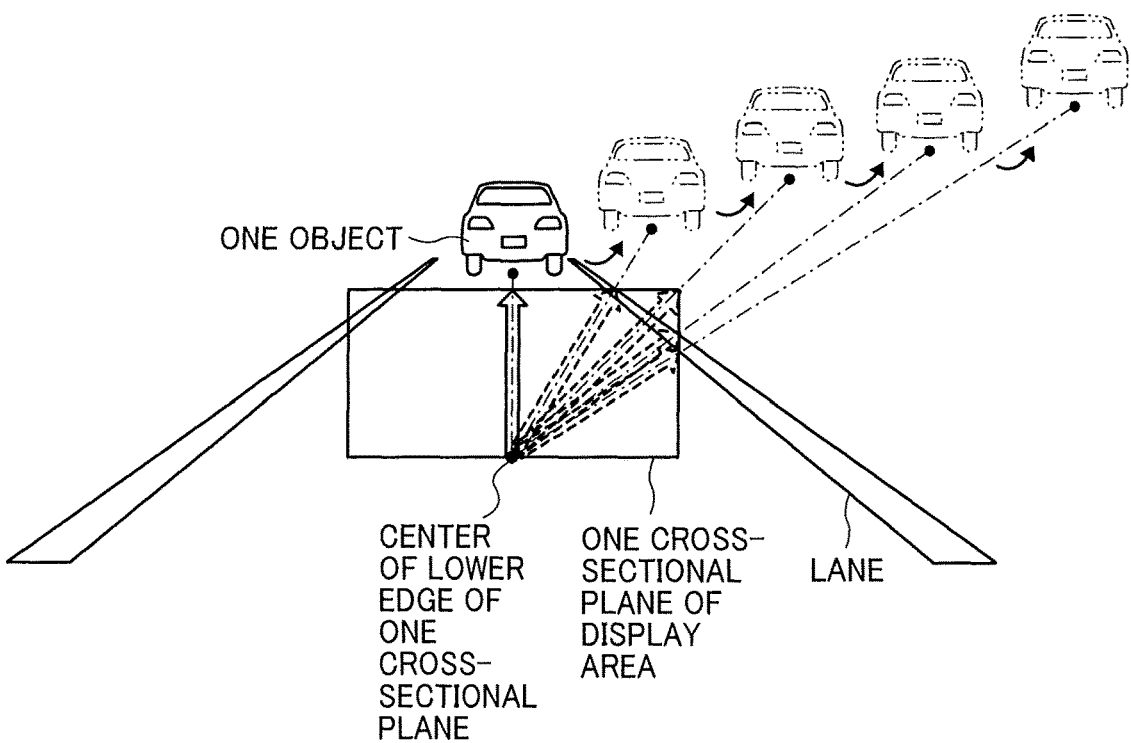
FIG. 26B is an illustration for describing an example in which the orientation and length of the indicator changes with continuous changes in position of the same object.

As illustrated in FIG. 26B, the indicator is rotated around the reference point as the axis while changing the length thereof.

From the first point of view, the HUD 100, which is mounted on a vehicle, according to the present embodiment described above includes a LiDAR 200 (a detection system) and a display system (the image data generator 804 and the imaging unit 806). The LiDAR 200 detects a position (hereinafter referred to as a relative position) of an object relative to the vehicle. The display system, which serves as the image data generator 804 and the imaging unit 806, displays an indicator as a virtual image within a display area based on a detection result of the LiDAR 200, to indicate the relative position of the object. The display system includes a display controller 902 (a controller) to change an orientation of the indicator with the relative position of the object.

From the second point of view, the HUD 100, which is mounted on a vehicle, according to the present embodiment described above includes a display system (the image data generator 804 and the imaging unit 806). The display system, which serves as the image data generator 804 and the imaging unit 806, displays an indicator as a virtual image within a display area based on a detection result of the LiDAR 200 (a detector) mounted on a vehicle that detects a position (hereinafter referred to as a relative position) of an object relative to the vehicle, so as to indicate the relative position of the object. The display system includes a display controller 902 (a controller) to change an orientation of the indicator with the relative position of the object.

In the HUD 100, the orientation of the indicator changes with the relative position of the object. Accordingly, even with the changes in relative position of the object, the indicator indicates the position of the object.

The HUD 100 according to at least one embodiment of the present disclosure allows a stable and accurate recognition of the relative position of an object with respect to the vehicle of the driver.

In the technology as a comparative example, a mark is displayed to specify an object, in direct contact with (in proximity to) the object at all times. However, such a mark may not be displayed depending on the size of the display area or the relative position of the object. That is, such a display of marks is successful when an object overlaps (is within) the display area as viewed from the viewer, and is unsuccessful when an object does not overlap (is not within) the display area. Further, even if the mark is displayed in the display area, when the mark separates (moves away) from the object, the viewer fails to specify the object and thereby fails to recognize the position of the object. This is because the orientation of the mark does not follow the change of the position of the object.

However, the HUD 100 according to at least one embodiment allows an indicator to indicate the position of the object even when the object does not overlap (is not within) the display area. Further, in the HUD 100 according to at least one embodiment of the present disclosure, the orientation of the indicator changes with (follows) the position of the object, thereby allowing the recognition of the position of the object even when the indicator moves away (separates) from the object.

Further, the display controller 902 preferably controls the position of the indicator within the display area to follow (change with) the relative position of the object. This configuration allows the indicator to be displayed at a position close to the object, within the display area. In such a configuration, the orientation as well as the display position of the indicator allows recognizing the relative position of the object. That is, the configuration allows stably and accurately recognizing the position of the object.

Further, the display controller 902 preferably displays an indicator on a line segment connecting the reference viewpoint in the vehicle and the point close to the object within the display area. The "reference viewpoint" refers to the viewpoint position of the viewer and an arbitrary point within a predetermined area that is assumed to be a position at which the eye of an arbitrary viewer is located on the design. For example, when the viewer is a driver of the vehicle, the reference viewpoint is an arbitrary point within a predetermined area above the driver's seat in the vehicle.

Further, the display controller 902 displays an indicator such that the orientation of the indicator is parallel to the above-described line segment when at least a part of the object is within the angle of view of the display area.

The display controller 902 displays the indicator such that the orientation of the indicator and the above-described line segment form an angle when the object as a whole is outside the angle of view of the display area.

Further, the display controller 902 preferably moves the indicator from a position closer to the reference viewpoint (for example, the reference point within the display area) to another position closer to the point close to the object on the above-described line segment in displaying the indicator. Note that the reference point is preferably positioned on the outer edge of the display area.

This configuration allows the viewer (the driver) to physically feel it easy to recognize the relative position of the object with the movement of the indicator.

Further, the display controller 902 determines, as an indication target, one object with the first priority to be indicated by the indicator when a plurality of objects is present. The display controller 902 further switches the indication target from the one object to another object after changing of the first priority (that has been newly determined as the object with the first priority to be indicated by the indicator) when there is a change in the object with the first priority to be indicated by the indicator. This configuration allows the indicator to indicate the relative position of the object with the first priority to be indicated by the indicator at all times.

Further, the display controller 902 preferably moves the indicator from a position close to one object to another position close to another object within the display area when switching the indication target from the one object to said another object. With this configuration, the movement of the indicator allows physically feeling it easy to recognize that the indication target has been changed from one object to another object.

Further, the display controller 902 smoothly moves the indicator along a curve, for example, when switching the indication target or when making the indicator follow the movement of the object. This configuration facilitates following the movement of the indicator and recognizing from which object to which object the indication target has been changed or from which position to which position the object has been moved as compared to the cases where, for example, the indicator rapidly moves along the straight line.

When switching the indication target from one object to another object, the display controller 902 preferably displays an indicator within the display area to allow recognizing the switch of the indication target. To display such an indicator, for example, it is conceivable that the brightness of the indicator is increased and emphasized or blinked while changing the orientation or the display position of the indicator.

Further, the display controller 902 does not display the indicator in the display area when no object is present. This configuration allows the viewer to recognize that there is no object, and further prevents an erroneous recognition that any object is present.

The display system includes an image-forming unit and a concave mirror 40 as a light guide. The image-forming unit includes the optical scanning device 10 and the screen 30 to form an image of an indicator with light. The concave mirror 40 guides light forming the image of the indicator to the windshield 50 as a transmission and reflection member.

Further, according to the vehicle apparatus including the HUD 100 and the vehicle on which the HUD 100 is mounted, appropriate driving operation according to the relative position of the object can be promoted.

A display method 1 according to an embodiment of the present disclosure is a method of displaying an indicator as a virtual image within a display area, the indicator indicating a position (hereinafter, referred to also as a relative position) of an object relative to a vehicle. The display method 1 includes first detecting a relative position of an object, displaying the indicator to indicate the relative position detected in the first detecting, second detecting a relative position of the object; and changing an orientation of the indicator to indicate the relative position detected in the second detecting when the relative position detected in the first detecting differs from the relative position detected in the second detecting. This configuration allows the orientation of the indicator to change with the relative position of the object, which allows the indicator to indicate the position of the object even with a change in the relative position of the object. Such a configuration thus allows stably and correctly recognizing the relative position of the object with respect to the vehicle.

The display method 1 according to an embodiment of the present disclosure further includes third detecting a relative position of the object, and changing the orientation of the indicator to indicate the relative position detected in the third detecting when the relative position detected in the second detecting differs from the relative position detected in the third detecting. This configuration allows the orientation of the indicator to further change with the relative position of the object, which allows the indicator to indicate the position of the object even with a further change in the relative position of the object.

A display method 2 according to an embodiment of the present disclosure is a method of displaying an indicator as a virtual image within a display area, the indicator indicating a relative position of an object with respect to a vehicle. The display method 2 includes, when a plurality of objects is present, first detecting positions of the plurality of objects; first selecting an object with the first priority to be indicated by the indicator from the plurality of objects based on a detection result of the first detecting; displaying the indicator to indicate a position of the object selected in the first selecting, the position is one of the positions of the plurality of objects detected in the first detecting. The display method 2 further includes second detecting positions of a plurality of objects when the plurality of objects is present; second selecting an object with the first priority to be indicated by the indicator from the plurality of objects detected in the second detecting based on a detection result of the second detecting; changing an orientation of the indicator to the position of the object detected in the second detecting when the object selected in the first selecting is the same as the object selected in the second selecting and the position of the object detected in the first detecting differs from a position of the object detected in the second detecting. The display method 2 further includes changing the orientation of the indicator to the position detected in the second detecting of the object selected in the second selecting when the object selected in the first selecting differs from the object selected in the second selecting. This configuration allows the orientation of the indicator to change with the relative position of the object, which allows the indicator to indicate the position of the object even with a change in the relative position of the object. This configuration further allows changing the indication target from an object before changing of the indication target to another object after changing of the indication target when there is a change in the object with the first priority to be indicated by the indicator.

Such a configuration thus allows stably and correctly recognizing the relative position of the object with respect to the vehicle. In such a configuration, changes in the indication target can be handled.

The display method 2 includes, when a plurality of objects is present, third detecting positions of the plurality of objects; third selecting an object with the first priority to be indicated by the indicator from the plurality of objects based on a detection result of the third detecting; changing an orientation of the indicator to the position of the object detected in the third detecting when the object selected in the second selecting is the same as the object selected in the third selecting and the position of the object detected in the second detecting differs from a position of the object detected in the third detecting. The display method 2 further includes changing the orientation of the indicator to the position detected in the third detecting of the object selected in the third selecting when the object selected in the second selecting differs from the object selected in the third selecting. This configuration further allows changing the indication target from an object before changing of the indication target to another object after changing of the indication target when there is an additional change in the object with the first priority to be indicated by the indicator.

In the above-described embodiment, the display controller 902 sets the orientation and display position of the indicator. In some embodiments, for example, the control unit 8060 or the CPU 602 sets the orientation and display position of the indicator. In this case, the control unit 8060 or the CPU 602 serves as a control unit, instead of the display controller 902.

In the above-described embodiment, the "control unit" of the present disclosure is the display controller 902. In some embodiments, the control unit further includes the indicator data generator 903 in addition to the display controller 902.

In the above-described embodiment, the indicator data generator 903 generates image data of the indicator based on the setting data regarding the orientation and the display position of the indicator. In some embodiments, for example, the control unit 8060 or the CPU 602 generates the setting data. In this configuration, the indicator data generator 903 is not used.

In the above-described embodiment, the driver of the vehicle is an example of a person to visually recognize a virtual image. In some embodiments, the person to visually recognize a virtual image is another person (for example, a person on the vehicle other than the driver) capable of visually recognizing a virtual image other than the driver of the vehicle.

In the HUD according to the above-described embodiment, the light guide is the concave mirror 40. However, the present disclosure is not limited thereto. In some embodiments, the light guide is, e.g., a convex mirror, or includes a curved mirror (a concave mirror or a convex mirror) and a reflecting mirror disposed between the curved mirror and the screen 30.

In the above-described embodiment, the optical scanning device includes the scanning mirror 20, but may not include the scanning mirror 20.

In the above-described embodiment, a laser diodes (LD), such as an end-surface emitting laser, is used as the light-source unit 11. Alternatively, other types of light source, such as vertical-cavity surface-emitting lasers (VCSEL), may be used.

In the above-described embodiment, the HUD 100 is compatible with a color image. However, the HUD 100 is compatible with a monochrome image.

Moreover, the transmission and reflection member is not limited to a windshield (front window) of a vehicle, and may be, for example, a side windshield or a rear windshield. That is, the transmission and reflection member is preferably a window member (windshield) that is mounted on a vehicle for a viewer to visually identify the outside of the vehicle.

In the above-described embodiment, cases in which the HUD 100 is mounted on a vehicle were described. However, no limitation is indicated thereby, and variations may be made as long as the HUD 100 is mounted on a vehicle that travels on a road surface. For example, the vehicle used in a vehicle apparatus according to the present disclosure is not limited to a four-wheeled vehicle, and may be a motorcycle or an auto tricycle. In this case, a windshield or a combiner is preferably mounted on a vehicle as the transmission and reflection member. Examples of a power source of a vehicle include, for example, an engine, a motor, and the combination thereof.

Further, the specific numerical values and shapes in the above-described embodiments are just examples and are appropriately modified without departing from the spirit of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A head-up display (HUD) mountable on a vehicle, the HUD comprising:
   circuitry configured to:
      obtain, as the vehicle travels, a detection result indicating a position of an object relative to the vehicle;
      control a display system to display, based on the detection result, an indicator as a virtual image within a display area of the display system, the indicator being oriented in a direction from a reference position in the display area towards the position of the object so as to point towards the object;
      obtain, as the vehicle travels, a second detection result indicating an updated position of the object relative to the vehicle; and
      control, based on the second detection result, the display system to adjust the display of the indicator within the display area by:
         changing an orientation of the indicator according to the updated position of the object relative to the vehicle so that the indicator continues to point towards the object; and
         shifting a display position of the indicator closer to the updated position of the object, wherein
   in a case that the object includes a plurality of objects, the circuitry determines, as an indication target, one object with a first priority to be indicated by the indicator among the plurality of objects, and
   in a case that an order of priority changes, the circuitry switches the indication target from the one object with the first priority to other object with the first priority.

2. The HUD according to claim 1, wherein the circuitry controls the display system to shift the display position of the indicator within the display area according to the updated position of the object.

3. The HUD according to claim 1, wherein to switch the indication target from the one object to the other object, the circuitry controls the display system to display the indicator within the display area to facilitate a user recognition of the switching.

4. The HUD according to claim 1, wherein in a case that no object is detected, the circuitry does not control the display system to display the indicator within the display area.

5. The HUD according to claim 1, wherein the display system includes:
   a display to form an image of the indicator with light; and
   a light guide to guide the light forming the image to a transmission and reflection member.

6. A system for the vehicle, the system comprising:
   the HUD according to claim 1; and
   the vehicle on which the HUD is mounted.

7. The HUD of claim 1, further comprising a detection system.

8. The HUD according to claim 1, wherein
the circuitry repeatedly obtains detection results indicating the position of the object relative to the vehicle, and
the circuit controls the display system to adjust the display of the indicator according to each newly obtained detection result.

9. The HUD according to claim 1, further comprising:
a light detection ranging device (LiDAR) configured to detect the position of the object, wherein
the circuitry obtains the detection result from the LiDAR.

10. The HUD according to claim 1, wherein the circuitry controls the display system to move the indicator from a position near the one object to a position near the other object within the display area to switch the indication target from the one object to the other object.

11. The HUD according to claim 10, wherein the circuitry controls the display system to move the indicator along a curve.

12. The HUD according to claim 1, wherein the circuitry controls the display system to display the indicator on a line segment connecting a reference viewpoint in the vehicle and a point within the display area that is close to the object.

13. The HUD according to claim 12, wherein the circuitry controls the display system to display the indicator with the orientation parallel with the line segment in a case that at least a part of the object is within an angle of view of the display area.

14. The HUD according to claim 12, wherein the circuitry controls the display system to display the indicator to form an angle between the orientation of the indicator and the line segment in a case that the object as a whole is outside the angle of view of the display area.

15. The HUD according to claim 12, wherein the circuitry controls the display system to move the indicator from a side of the reference viewpoint to a side of the point close to the object on the line segment within the display area while displaying the indicator.

16. A method of displaying, performed by a head-up display mountable on a vehicle, the method comprising:
obtaining, as the vehicle travels, a detection result indicating a position of an object relative to the vehicle;
controlling a display system to display, based on the detection result, an indicator as a virtual image within a display area of the display system, the indicator being oriented in a direction from a reference position in the display area towards the position of the object so as to point towards the object;
obtaining, as the vehicle travels, a second detection result indicating an updated position of the object relative to the vehicle;
controlling, based on the second detection result, the display system to adjust the display of the indicator within the display area by:
changing an orientation of the indicator according to the updated position of the object relative to the vehicle so that the indicator continues to point towards the object; and
shifting a display position of the indicator closer to the updated position of the object;
in a case that the object includes a plurality of objects, determining, as an indication target, one object with a first priority to be indicated by the indicator among the plurality of objects; and
in a case that an order of priority changes, switching the indication target from the one object with the first priority to other object with the first priority.

17. The method according to claim 16, further comprising:
shifting the orientation of the indicator in a case that the detection result indicates that a currently detected position of the object differs from a previously detected position of the object.

18. The method of displaying of claim 16, wherein in the case that the object includes a plurality of objects, the detection result includes a plurality of detection results that respectively indicate the plurality of objects, and the method further comprises:
selecting, based on the detection results, a first object of the plurality of objects as an object with first priority to be indicated by the indicator;
displaying the indicator to indicate a position of the first object based on the detection result of the first object;
determining whether the object with first priority to be indicated by the indicator changes from the first object to a second object of the plurality of objects, based on the detection result of the second object; and
changing an orientation of the indicator to a position of the second object indicated by the detection result of the second object in a case that the first object differs from the second object.

19. A non-transitory recording medium storing computer executable instructions which, when executed by a head-up display mountable on a vehicle, cause the head-up display to execute a method comprising:
obtaining, as the vehicle travels, a detection result indicating a position of an object relative to the vehicle;
controlling a display system to display, based on the detection result, an indicator as a virtual image within a display area of the display system, the indicator being oriented in a direction from a reference position in the display area towards the position of the object so as to point towards the object;
obtaining, as the vehicle travels, a second detection result indicating an updated position of the object relative to the vehicle; and
controlling, based on the second detection result, the display system to adjust the display of the indicator within the display area by:
changing an orientation of the indicator according to the updated position of the object relative to the vehicle so that the indicator continues to point towards the object; and
shifting a display position of the indicator closer to the updated position of the object;
in a case that the object includes a plurality of objects, determining, as an indication target, one object with a first priority to be indicated by the indicator among the plurality of objects; and
in a case that an order of priority changes, switching the indication target from the one object with the first priority to other object with the first priority.

* * * * *